(12) United States Patent
Gannu et al.

(10) Patent No.: US 8,886,797 B2
(45) Date of Patent: Nov. 11, 2014

(54) SYSTEM AND METHOD FOR DERIVING USER EXPERTISE BASED ON DATA PROPAGATING IN A NETWORK ENVIRONMENT

(75) Inventors: Satish K. Gannu, Santa Clara, CA (US); Ashutosh A. Malegaonkar, Milpitas, CA (US); Deepali Raina, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 234 days.

(21) Appl. No.: 13/182,862

(22) Filed: Jul. 14, 2011

(65) Prior Publication Data

US 2013/0018967 A1    Jan. 17, 2013

(51) Int. Cl.
G06F 15/173    (2006.01)
G06F 17/30    (2006.01)

(52) U.S. Cl.
CPC ............................... *G06F 17/30902* (2013.01)
USPC ..................................................... 709/224

(58) Field of Classification Search
CPC .............................. H04L 67/025; H04L 67/22
USPC ..................... 709/204, 206, 217–218, 224
See application file for complete search history.

(56) References Cited

U.S. PATENT DOCUMENTS

| 5,613,032 A | 3/1997 | Cruz et al. |
|---|---|---|
| 5,677,901 A | 10/1997 | Iwamura |
| 5,857,179 A | 1/1999 | Vaithyanathan et al. |
| 5,961,582 A | 10/1999 | Gaines |
| 6,012,053 A | 1/2000 | Pant et al. |
| 6,026,388 A | 2/2000 | Liddy et al. |
| 6,301,586 B1 | 10/2001 | Yang et al. |
| 6,304,283 B1 | 10/2001 | Kitagawa |
| 6,345,253 B1 | 2/2002 | Viswanathan |
| 6,697,793 B2 | 2/2004 | McGreevy |
| 6,980,660 B1 | 12/2005 | Hind et al. |
| 7,017,183 B1 | 3/2006 | Frey et al. |
| 7,072,837 B2 | 7/2006 | Kemble et al. |
| 7,099,867 B2 | 8/2006 | Okada et al. |
| 7,260,312 B2 | 8/2007 | Srinivasan et al. |
| 7,292,532 B2 | 11/2007 | Sakata et al. |
| 7,350,227 B2 | 3/2008 | McGrew et al. |
| 7,417,959 B2 | 8/2008 | Dorner et al. |
| 7,457,808 B2 | 11/2008 | Gaussier et al. |

(Continued)

FOREIGN PATENT DOCUMENTS

| CN | 102648464 A | 8/2012 |
|---|---|---|
| EP | 2483803 | 4/2011 |

(Continued)

OTHER PUBLICATIONS

Wasilewska, Anita, CSE 634—Data Mining: Text Mining; 85 pages; www.cs.sunysb.edu/~cse634/presentations/TextMining.pdf.

(Continued)

*Primary Examiner* — Jason Recek
(74) *Attorney, Agent, or Firm* — Patent Capital Group

(57) ABSTRACT

A method is provided in one example and includes evaluating network traffic; identifying data within the network traffic that is associated with a uniform resource locator (URL); identifying at least one condition associated with the URL; and classifying the URL as a transitional web page or as a valuable web page based on the condition.

20 Claims, 10 Drawing Sheets

(56) References Cited

U.S. PATENT DOCUMENTS

| | | | |
|---|---|---|---|
| 7,493,369 B2 | 2/2009 | Horvitz et al. | |
| 7,509,491 B1 | 3/2009 | Wainner et al. | |
| 7,603,350 B1 | 10/2009 | Guha | |
| 7,617,451 B2 | 11/2009 | Jones et al. | |
| 7,698,442 B1* | 4/2010 | Krishnamurthy et al. | 709/229 |
| 7,706,265 B2 | 4/2010 | Monette et al. | |
| 7,809,714 B1 | 10/2010 | Smith | |
| 7,818,215 B2 | 10/2010 | King et al. | |
| 7,827,191 B2 | 11/2010 | Williams | |
| 7,853,553 B2 | 12/2010 | Lankinen et al. | |
| 7,913,176 B1 | 3/2011 | Blattner et al. | |
| 8,015,250 B2* | 9/2011 | Kay | 709/206 |
| 8,051,204 B2 | 11/2011 | Kai et al. | |
| 8,214,209 B2 | 7/2012 | Nagatomo | |
| 8,255,386 B1 | 8/2012 | Annau et al. | |
| 8,260,774 B1 | 9/2012 | Aggarwal | |
| 8,374,983 B1* | 2/2013 | Pohl et al. | 706/46 |
| 2002/0032772 A1 | 3/2002 | Olstad et al. | |
| 2002/0035605 A1 | 3/2002 | McDowell et al. | |
| 2002/0087311 A1 | 7/2002 | Leung Lee et al. | |
| 2002/0091741 A1 | 7/2002 | Ferreira et al. | |
| 2002/0093915 A1 | 7/2002 | Larson | |
| 2003/0014399 A1* | 1/2003 | Hansen et al. | 707/3 |
| 2003/0014448 A1 | 1/2003 | Castellanos et al. | |
| 2003/0014586 A1 | 1/2003 | Mitsuda et al. | |
| 2003/0028773 A1 | 2/2003 | McGarvey et al. | |
| 2003/0028896 A1 | 2/2003 | Swart et al. | |
| 2003/0033288 A1 | 2/2003 | Shanahan et al. | |
| 2003/0074555 A1 | 4/2003 | Fahn et al. | |
| 2003/0093789 A1 | 5/2003 | Zimmerman et al. | |
| 2004/0049714 A1 | 3/2004 | Marples et al. | |
| 2004/0158609 A1 | 8/2004 | Daniell et al. | |
| 2004/0193426 A1 | 9/2004 | Maddux et al. | |
| 2004/0208123 A1 | 10/2004 | Sakata et al. | |
| 2004/0258396 A1 | 12/2004 | Nakamura et al. | |
| 2005/0004922 A1 | 1/2005 | Zernik | |
| 2005/0060283 A1 | 3/2005 | Petras et al. | |
| 2005/0063352 A1 | 3/2005 | Amara et al. | |
| 2005/0068167 A1 | 3/2005 | Boyer et al. | |
| 2005/0076198 A1 | 4/2005 | Skomra et al. | |
| 2005/0086197 A1 | 4/2005 | Boubez et al. | |
| 2005/0102522 A1 | 5/2005 | Kanda | |
| 2005/0108001 A1 | 5/2005 | Aarskog | |
| 2005/0160166 A1 | 7/2005 | Kraenzel | |
| 2005/0272405 A1 | 12/2005 | Tomlinson et al. | |
| 2006/0048210 A1 | 3/2006 | Hildre et al. | |
| 2006/0149781 A1 | 7/2006 | Blankinship | |
| 2006/0150253 A1 | 7/2006 | Feuerstein et al. | |
| 2006/0168213 A1 | 7/2006 | Richardson et al. | |
| 2006/0206483 A1 | 9/2006 | Knepper et al. | |
| 2006/0224587 A1* | 10/2006 | Zamir et al. | 707/7 |
| 2006/0285493 A1 | 12/2006 | Manuja et al. | |
| 2007/0016583 A1 | 1/2007 | Lempel et al. | |
| 2007/0038437 A1 | 2/2007 | Brun | |
| 2007/0106908 A1 | 5/2007 | Miyazaki et al. | |
| 2007/0118275 A1 | 5/2007 | Qi et al. | |
| 2007/0198725 A1 | 8/2007 | Morris | |
| 2007/0206617 A1 | 9/2007 | Andreasen et al. | |
| 2007/0239680 A1* | 10/2007 | Oztekin et al. | 707/3 |
| 2007/0239837 A1 | 10/2007 | Jablokov et al. | |
| 2007/0244892 A1 | 10/2007 | Narancic | |
| 2007/0253682 A1 | 11/2007 | Chang et al. | |
| 2007/0260684 A1 | 11/2007 | Sharma et al. | |
| 2007/0266020 A1 | 11/2007 | Case et al. | |
| 2007/0294265 A1* | 12/2007 | Askew et al. | 707/100 |
| 2008/0027981 A1 | 1/2008 | Wahl | |
| 2008/0060055 A1 | 3/2008 | Lau | |
| 2008/0065892 A1 | 3/2008 | Bailey et al. | |
| 2008/0077791 A1 | 3/2008 | Lund et al. | |
| 2008/0091670 A1 | 4/2008 | Ismalon | |
| 2008/0097985 A1 | 4/2008 | Olstad et al. | |
| 2008/0104128 A1 | 5/2008 | Drayer et al. | |
| 2008/0126690 A1 | 5/2008 | Rajan et al. | |
| 2008/0140674 A1 | 6/2008 | Ishikawa | |
| 2008/0154873 A1 | 6/2008 | Redlich et al. | |
| 2008/0184326 A1 | 7/2008 | Nakajima | |
| 2008/0222142 A1 | 9/2008 | O'Donnell | |
| 2008/0244740 A1 | 10/2008 | Hicks et al. | |
| 2008/0294903 A1 | 11/2008 | Miyazaki et al. | |
| 2008/0295040 A1 | 11/2008 | Crinon | |
| 2008/0313144 A1* | 12/2008 | Huston | 707/3 |
| 2009/0006333 A1 | 1/2009 | Jones et al. | |
| 2009/0049053 A1 | 2/2009 | Barker et al. | |
| 2009/0055175 A1 | 2/2009 | Terrell et al. | |
| 2009/0119278 A1* | 5/2009 | Cross et al. | 707/5 |
| 2009/0182727 A1 | 7/2009 | Majko | |
| 2009/0196570 A1 | 8/2009 | Dudas et al. | |
| 2009/0210715 A1 | 8/2009 | Izu et al. | |
| 2009/0226870 A1 | 9/2009 | Minotti | |
| 2009/0234497 A1 | 9/2009 | Uejo | |
| 2009/0234834 A1* | 9/2009 | Cozzi | 707/5 |
| 2009/0254572 A1 | 10/2009 | Redlich et al. | |
| 2009/0276377 A1 | 11/2009 | Dutta et al. | |
| 2009/0293016 A1 | 11/2009 | Potevin et al. | |
| 2009/0319365 A1 | 12/2009 | Waggoner et al. | |
| 2009/0327271 A1 | 12/2009 | Amitay et al. | |
| 2010/0005306 A1 | 1/2010 | Izu et al. | |
| 2010/0010968 A1 | 1/2010 | Redlich et al. | |
| 2010/0057815 A1 | 3/2010 | Spivack et al. | |
| 2010/0088331 A1* | 4/2010 | White et al. | 707/759 |
| 2010/0153855 A1 | 6/2010 | Roberts et al. | |
| 2010/0179801 A1 | 7/2010 | Huynh et al. | |
| 2010/0217975 A1 | 8/2010 | Grajek et al. | |
| 2010/0223581 A1 | 9/2010 | Manolescu et al. | |
| 2010/0223629 A1 | 9/2010 | Appelbaum et al. | |
| 2010/0250547 A1 | 9/2010 | Grefenstette et al. | |
| 2010/0274815 A1 | 10/2010 | Vanasco | |
| 2010/0280985 A1 | 11/2010 | Duchon et al. | |
| 2010/0306816 A1 | 12/2010 | McGrew et al. | |
| 2011/0077936 A1 | 3/2011 | Arumugam et al. | |
| 2011/0078167 A1 | 3/2011 | Sundaresan et al. | |
| 2011/0078550 A1* | 3/2011 | Nabutovsky | 715/206 |
| 2011/0099195 A1 | 4/2011 | Patwardhan et al. | |
| 2011/0119264 A1 | 5/2011 | Hu et al. | |
| 2011/0161409 A1 | 6/2011 | Nair et al. | |
| 2011/0173260 A1 | 7/2011 | Biehl et al. | |
| 2011/0196802 A1 | 8/2011 | Ellis et al. | |
| 2011/0208522 A1 | 8/2011 | Pereg et al. | |
| 2011/0225048 A1 | 9/2011 | Nair | |
| 2011/0231296 A1* | 9/2011 | Gross et al. | 705/37 |
| 2011/0252330 A1* | 10/2011 | Catlin et al. | 715/738 |
| 2011/0270709 A1 | 11/2011 | Lewis et al. | |
| 2011/0270843 A1* | 11/2011 | Albin | 707/741 |
| 2011/0304685 A1 | 12/2011 | Khedouri et al. | |
| 2012/0002544 A1 | 1/2012 | Kokku et al. | |
| 2012/0030232 A1 | 2/2012 | John et al. | |
| 2012/0046936 A1 | 2/2012 | Kandekar et al. | |
| 2012/0078952 A1 | 3/2012 | Araya | |
| 2012/0081506 A1 | 4/2012 | Marvit | |
| 2012/0102050 A1 | 4/2012 | Button et al. | |
| 2012/0110087 A1 | 5/2012 | Culver et al. | |
| 2012/0185239 A1 | 7/2012 | Goud et al. | |
| 2012/0262533 A1 | 10/2012 | Gannu et al. | |
| 2012/0271805 A1* | 10/2012 | Holenstein et al. | 707/706 |

FOREIGN PATENT DOCUMENTS

| | | |
|---|---|---|
| WO | WO02/42864 | 5/2002 |
| WO | WO02/42940 | 5/2002 |
| WO | WO2011/041443 | 4/2011 |
| WO | WO2012/173780 | 12/2012 |

OTHER PUBLICATIONS

WebChoir Products—Personal Vocabulary Tools, "Personal Tools," 1 page; printed Sep. 30, 2009 http://www.webchoir.com/products/ptt.html.

Wikipedia, "Homophone," 3 pages; printed Sep. 30, 2009; http://en.wikipedia.org/wiki/Homophone.

Wikipedia, "International Phonetic Alphabet," 19 pages; printed Sep. 30, 2009; http://en.wikipedia.org/wiki/International_Phonetic_Alphabet.

(56) References Cited

OTHER PUBLICATIONS

Wikipedia, "Phoneme," 7 pages; printed Sep. 30, 2009; http://en.wikipedia.org/wiki/Phoneme.
Li, Yingbo, et al., "Multi-Video Summarization Based on OB-MMR," EURECOM, Sophia Antipolis, France, Content-Based Multimedia Indexing (CBMI) 2011 9th International Workshop; 6 pages http://www.eurecom.fr/fr/publication/3365/download/mm-publi-3365.pdf.
Masnick, Mike, "Creating an Automatic Highlight Reel for Sporting Events (Bleeding Edge)," TechDirt lite, Aug. 20, 2003, 2 pages http://www.techdirt.com/article_lite.php?sid=20030820/0042248&pid=17.
Shao, Jian, et al., "Multi-Video Summarization Using Complex Graph Clustering and Mining," Computer Science and Information Systems, vol. 7, No. 1 (2010); 14 pages http://www.doiserbia.nb.rs/img/doi/1820-0214/2010/1820-02141001085S.pdf.
Tian, Ying-li, et al., "IBM Smart Surveillance System (S3): Event Based Video Surveillance System with an Open and Extensible Framework," Special Issue of Machine Vision and Applications Journal, 2008, vol. 19, Issue 5-6, 30 pages http://www.docstoc.com/docs/20141664/IBM-Smart-Surveillance-System-(53)-Event-Based-Video-Surveillance.
Wang, Feng, et al., "Multi-Document Video Summarization," ICME 2009, IEEE International Conference on Multimedia and Expo, 4 pages http://www.eurecom.fr/fr/publication/2751/download/mm-publi-2751.pdf.
Seher, Indra, ""Query Expansion in Personal Queries,"" IADIAS (International Association for Development of the Information Society) 2006, 5 pages www.iadis.org/Multi2006/papers/16/5023_ISA.
"Click Scoring Relevance Framework," LucidWorks, 7 pages [retrieved and printed May 7, 2012] http://lucidworks.lucidimagination.com/display/lweug/Click+Scoring+Relevance+Framework.
"Google Custom Search," Web Page, Google.com, © 2012 Google, 1 page http://www.google.com/cse/.
"Recommender System," Wikipedia, Apr. 28, 2012; 9 pages http://en.wikipedia.org/wiki/Recommender_system.
"Understanding Metadata," NISO Press, National Information Standards Organization, 2004, 20 pages.
Dang, et al., "Learning to Rank Query Reformulations," Proceedings of the 33rd Annual International ACM SIGIR Conference, SIGIR'10, Jul. 19-23, 2010, Geneva, Switzerland (2010); 2 pages.
Filippova, et al., Improved Video Categorization from Text Metadata and User Comments, Proceedings of the 34th Annual International ACM SIGIR Conference, SIGIR'11, Jul. 24-28, 2011, Beijing, China (2011); 8 pages.
Telestream, Inc. Product Literature, "Extracting and Preparing Metadata to Make Video Files Searchable," Telestream, Inc. 2008; 6 pages.
U.S. Appl. No. 13/364,102, filed Feb. 1, 2012 entitled "System and Method for Creating Customized On-Demand Video Reports in a Network Environment," Inventor(s): Deepti Patil, et al.
"The LNTS Leap: Phoneme Recognition," 2 pages; printed Sep. 30, 2009; http://www.Intstech.com.
Billi, R., et al., "Interactive Voice Technology at Work: The CSELT Experience," $2^{nd}$ IEEE Workshop on Interactive Voice Technology for Telecommunications Applications (IVTTA94); Sep. 26-27, 1994; pp. 43-48; http://ieeexplore.ieee.org/stamp/stamp.jsp?arnumber=00341547.
Carnegie Mellon University, "Speech at CMU," 4 pages; printed Sep. 30, 2009; http://www.speech.cs.cmu.edu/speech/.
"Caslon Analytics Echelon Note: Overview, May 2006, 6 pages; printed Sep. 30, 2009 http://www.caslon.com.au/echelonnote.htm".
Seher, Indra, "Query Expansion in Personal Queries," IADIAS (International Association for Development of the Information Society) 2006, 5 pages www.iadis.org/Multi2006/papers/16/5023_ISA.
Jiang, Weiliang, et al., "A Method for Personal Query Based on Role Preference Ontology," Industrial Mechanatronics and Automation, ICIMA 2009 International Conference, pp. 479-481; Abstract Only, 1 page.

Bollen, et al., "Usage Derived Recommendations for a Video Digital Library," Journal of Network and Computer Applications, Academic Press, New York, NY, vol. 30, No. 3, Mar. 16, 2007.
EPO Nov. 7, 2012 Response to Communication pursuant to Rule 161(1) and 162 from European Application No. 10770664; 8 pages.
Gligorov, "User-generated Metadata in Audio-visual Collections," Proceedings of the International World Wide Web Conference, WWW 2012, Apr. 16-20, 2012, Lyon, France (2012); 5 pages.
Harry, David, "The SEO Guide to Google Personalized Search," The Fire Horse Trail, SEO and Marketing Blog, Dec. 7, 2009, 9 pages http://www.huomah.com/Search-Engines/Search-Engine-Optimization/The-Seo-Guide-to-Google-Personalized-Search.html.
Jain, et al., "Learning to Re-Rank: Query-Dependent Image Re-Ranking Using Click Data," Proceedings of the International World Wide Web Conference, WWW 2011, Mar. 28-Apr. 1, 2011, Hyderabad, India (2011); 10 pages.
NSA Watch, "Other Surveillance Network: Governmental Surveillance Agencies," 2 pages; printed Sep. 30, 2009; http://www.nsawatch.org/networks.html.
Ohl, Ricky, "Computer Supported Argument Visualisation: Modelling Wicked Problems," Ph.D. Thesis, Australian Digital Theses Program, Feb. 2008; 403 pgs.; http://gu.edu.au:8080/adt-root/public/adt-QGU20090724.155249/index.html.
Oliveira, Bruno et al., "Automatic Tag Suggestion Based on Resource Contents," Knowledge Engineering: Practice and Patterns, Lecture Notes in Computer Science, 2008, vol. 5268/2008, DOI: 10.1007/978-3-54 [Abstract Only, 1 page]; http://www.springerlink.com/content/008w50405265r177/.
PCT Oct. 4, 2012 Notification of Transmittal of the International Search Report and Written Opinion of the International Search Authority from Application PCT/US2012/040097; 15 pages.
PCT Apr. 3, 2012 International Preliminary Report on Patentability and Wrtten Opinion of the International Searching Authority from International Application PCT/US2010/050762; 7 pages.
Rodriguez, et al. Automatic Metadata Generation Using Associative Networks, ACM Transactions on Information Systems, vol. 27, No. 2, Article 7, Feb. 2009.
Umbrich J., et al., "Four Heuristics to Guide Structured Content Crawling," Eighth International Conference on WEB Engineering, 2008, Jul. 14, 2008; © 2008 IEEE DOI 10.1109/ICWE.2008.42.
PCT Notification of Transmittal (1 page) of the International Search Report (3 pages), and Written Opinion of the International Searching Authority, or the Declaration (6 pages) mailed Jan. 12, 2011 for PCT/US2010/050762.
Chen, Hsinchun, et al., "A Concept Space Approach to Addressing the Vocabulary Problem in Scientific Information Retrieval: An Experiment on the Worm Community System," Journal of the American Society for Information Science Wiley for Asis USA, vol. 48, No. 1, Jan. 1997, XP002614340, ISSN: 0002-8231; pp. 17-31.
Chen, Rung-Ching, et al., "Adding New Concepts on the Domain Ontology Based on Semantic Similarity," International Conference on Business and Information, Jul. 12-14, 2006, XP002614339; 14 pages; http://bai2006.atisr.org/CD/Papers/2006bai6169.pdf.
Sethy, Abhinav, et al., "Building Topic Specific Language Models from Webdata Using Competitive Models," 9th European Conference on Speech Communication and Technology, Eurospeech Interspeech 2005 International Speech and Communication Association FR., 2005, pp. 1293-1296; XP 002614341; http://sail.usc.edu/publications/sethy-euro2005.pdf.
U.S. Appl. No. 12/471,404, filed Sep. 30, 2009, entitled "System and Method for Generating Personal Vocabulary from Network Data," Inventor(s): Satish K. Gannu, et al.
U.S. Appl. No. 12/571,414, filed Sep. 30, 2009, entitled "System and Method for Providing Speech Recognition Using Personal Vocabulary in a Network Environment," Inventor(s): Satish K. Gannu, et al.
U.S. Appl. No. 12/571,421, filed Sep. 30, 2009, entitled "System and Method for Ensuring Privacy While Tagging Information in a Network Environment," Inventor(s): Satish K. Gannu, et al.
U.S. Appl. No. 12/571,426, filed Sep. 30, 2009, entitled "System and Method for Controlling an Exchange of Information in a Network Environment," Inventor(s): Satish K. Gannu, et al.

(56) References Cited

OTHER PUBLICATIONS

U.S. Appl. No. 12/762,194, filed Apr. 16, 2010, entitled "System and Method for Deducing Presence Status from Network Data," Inventor(s): Thangavelu Arumugam, et al.
U.S. Appl. No. 12/778,899, filed May 12, 2010, entitled "System and Method for Deriving User Expertise Based on Data Propagating in a Network Environment," Inventor(s): Virgil N. Mihailovici, et al.
U.S. Appl. No. 12/971,852, filed Dec. 17, 2010, entitled "System and Method for Providing Argument Maps Based on Activity in a Network Environment," Inventor(s) Deepti Patil et al.
U.S. Appl. No. 12/971,946, filed Dec. 17, 2010, entitled "System and Method for Providing Feeds Based on Activity in a Network Environment," Inventor(s) Satish K. Gannu et al.
U.S. Appl. No. 13/088,974, filed Apr. 18, 2011, entitled "System and Method for Providing Augmented Data in a Network Environment," Inventor(s) Satish K. Gannu et al.
U.S. Appl. No. 13/098,112, filed Apr. 29, 2011, entitled "System and Method for Evaluating Visual Worthiness of Video Data in a Network Environment," Inventor(s) Deepti Patil et al.
U.S. Appl. No. 13/098,434, filed Apr. 30, 2011, entitled "System and Method for Media Intelligent Recording in a Network Environment," Inventor(s) Ashutosh A. Malegaonkar et al.
U.S. Appl. No. 13/149,405, filed May 31, 2011, entitled "System and Method for Evaluating Results of a Search Query in a Network Environment," Inventor(s) Satish K. Gannu et al.
U.S. Appl. No. 13/160,701, filed Jun. 15, 2011, entitled "System and Method for Discovering Videos," Inventor(s) Ashutosh A. Malegaonkar et al.
Hess, Andreas, et al., "Multi-Value Classification of Very Short Texts," 8 pages, printed on May 12, 2010; http://www.andreas-hess.info/publications/hess-ki08.pdf.
Horvitz, E., et al., "Coordinate: Probabilistic Forecasting of Presence and Availability," 2002, 10 pages, ftp://ftp.research.microsoft.com/pub/ejh/coordinate.pdf.
Kohl, J. and C. Neuman, The Kerberos Network Authentication Service (V5), Network Working Group, RFC 1510, 09.1993, 105 pages, http://www.ietf.org/rfc/rfc1510.
Lancope, "Stealth Watch," Revolutionize the Way You View Your Network, © 2009, 8 pages http://storage.pardot.com/2382/9637/StealthWatch_System_Family_Brochure.pdf.
Montgomery, W. A., et al., "Network Intelligence for Presence Enhanced Communication," SPIRITS Working Group, May 2002, 9 pages, http://ietfreport.isoc.org/all-ids/draft-montgomery-copeland-presence-spirits-00.txt.
Nortel Networks Wireless Solutions (A. Silver, J. Larkins, D. Stringer), "Unified Network Presence Management," A White Paper, © 2000, 6 pages, www.mobilein.com/UNPM.pdf.
U.S. Appl. No. 13/608,787, filed Sep. 10, 2012 entitled "System and Method for Enhancing Metadata in a Video Processing Environment," Inventor(s) Sandipkumar V. Shah, et al.

Grimes, Seth, "Sentiment Analysis: Opportunities and Challenges," Beye Network; Jan. 22, 2008; 6 pages, http://www.b-eye-network.com/view/6744.
Hess, Andreas, et al., "From Web 2.0 to Semantic Web: A Semi-Automated Approach," 15 pages; printed Sep. 30, 2009; http://www.andreas-hess.info/publications/hess-cisweb08.pdf.
iLogos v1.5 download (win); 4 pages. [Retrieved and printed on May 28, 2010] from http://www.phil.cmu.edu/projects/argument_mapping/.
Jadhav, N.S. and I.N. Dwivedi, "Social computing based personal vocabulary building," 5 pages; printed Sep. 30, 2009; http://www.priorartdatabase.com/IPCOM/000173550/.
Lacher, Martin S., et al., "On the Integration of Topic Maps and RDF Data," Extreme Markup Languages 2001, 14 pages.
Maybury, Mark et al., "Enterprise Expert and Knowledge Discovery," MITRE Technical Papers, The MITRE Corporation, Sep. 2000, 11 pages; http://www.mitre.org/work/tech_papers/tech_papers_00/maybury_enterprise/maybury_enterprise.pdf.
Moorthi, Y. L. R., "Have Breakfast or Be Breakfast," Wall Street Journal, Feb. 8, 2010, 2 pages; http://online.wsj.com/article/SB126465641868236415.html#printMode.
Nexidia, "Audio and Speech Analytics Software," 1 page; printed Sep. 30, 2009; http://www.nexidia.com.
Rosella Data Mining & Database Analytics, "Web Search and Web Navigation Pattern Analyzer," 3 pages; printed Jul. 25, 2011; http://222.roselladb.com/surf-pattern-analyzer.htm.
Smith, Ronnie W., "Performance Measures for the Next Generation of Spoken Natural Language Dialog Systems," pp. 37-40; http://acl.ldc.upenn.edu/W/W97/W97-0607.pdf.
Swabey, Pete, "Making the Invisible Visible," 2 pages; Sep. 23, 2009; http://www.trampolinesystems.com/news/in+the+news/archive/2009/59.
Trampoline Systems, "Navigation," 2 pages; printed Sep. 30, 2009; www.trampolinesystems.com.
Trant, Jennifer, "Studying Social Tagging and Folksonomy: A Review and Framework ," Jan. 2009, 10(1) Journal of Digital Information; 42 pages http://dlist.sir.arizona.edu/arizona/handle/10150/105375.
Virage, "Audio Analysis," Autonomy Virage, © 2009 Autonomy Virage, 1 page. http://www.virage.com/security-and-surveillance/functions/audio-analysis/index.htm.
Virage, "Understanding Video," Autonomy Virage, © 2009 Autonomy Virage, 5 pages http://www.virage.com/rich-media/technology/understanding-video/index.htm.
Wang, Xuerui, et al., "Topics over Time: A NonMarkov Continuous Time Model of Topical Trends," KDD'06, Aug. 20-23, 2006, 10 pages.
PCT Dec. 17, 2013 International Preliminary Report on Patentability from International Application Serial No. PCT/US2012/040097; 10 pages.

* cited by examiner

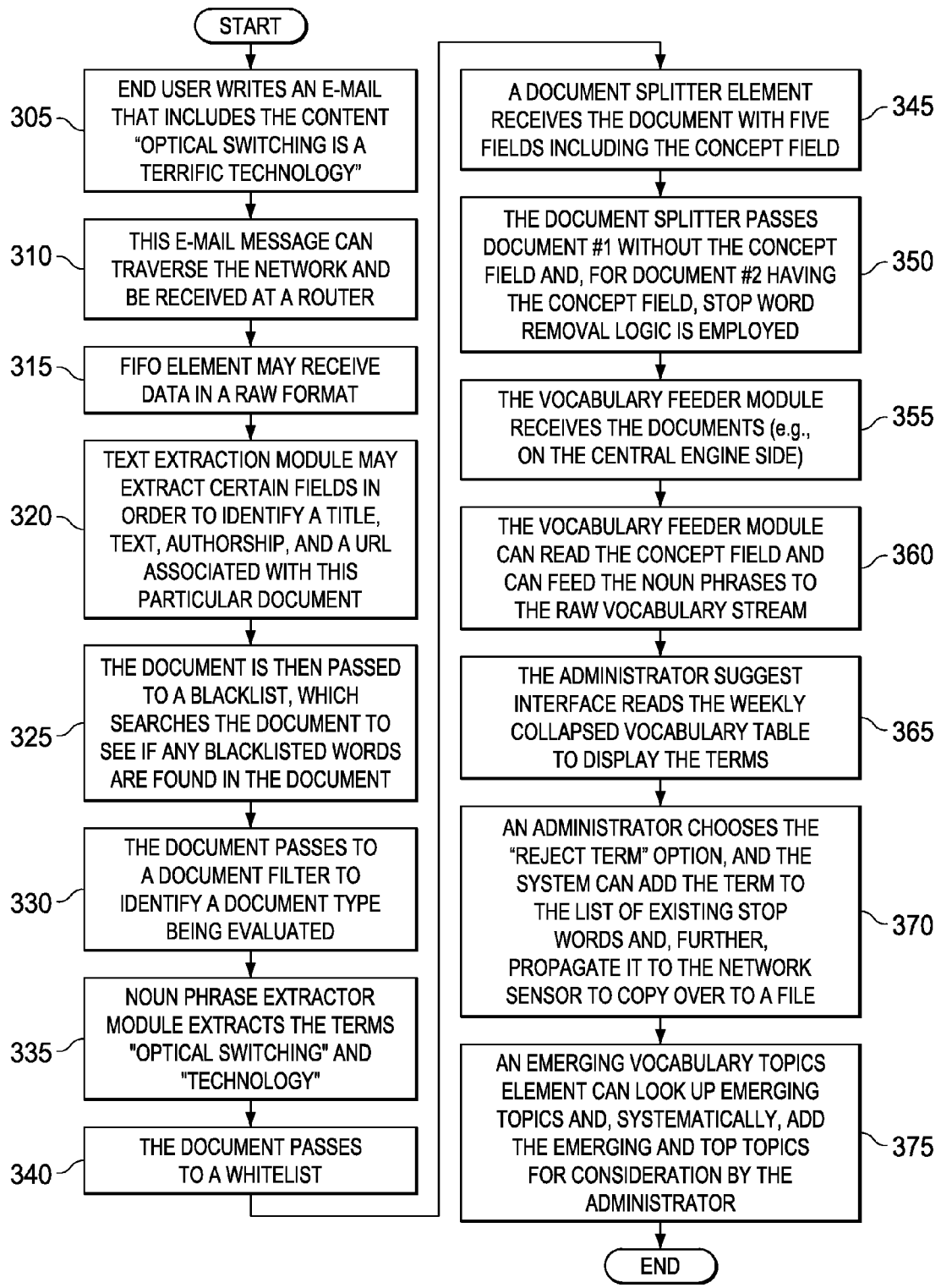

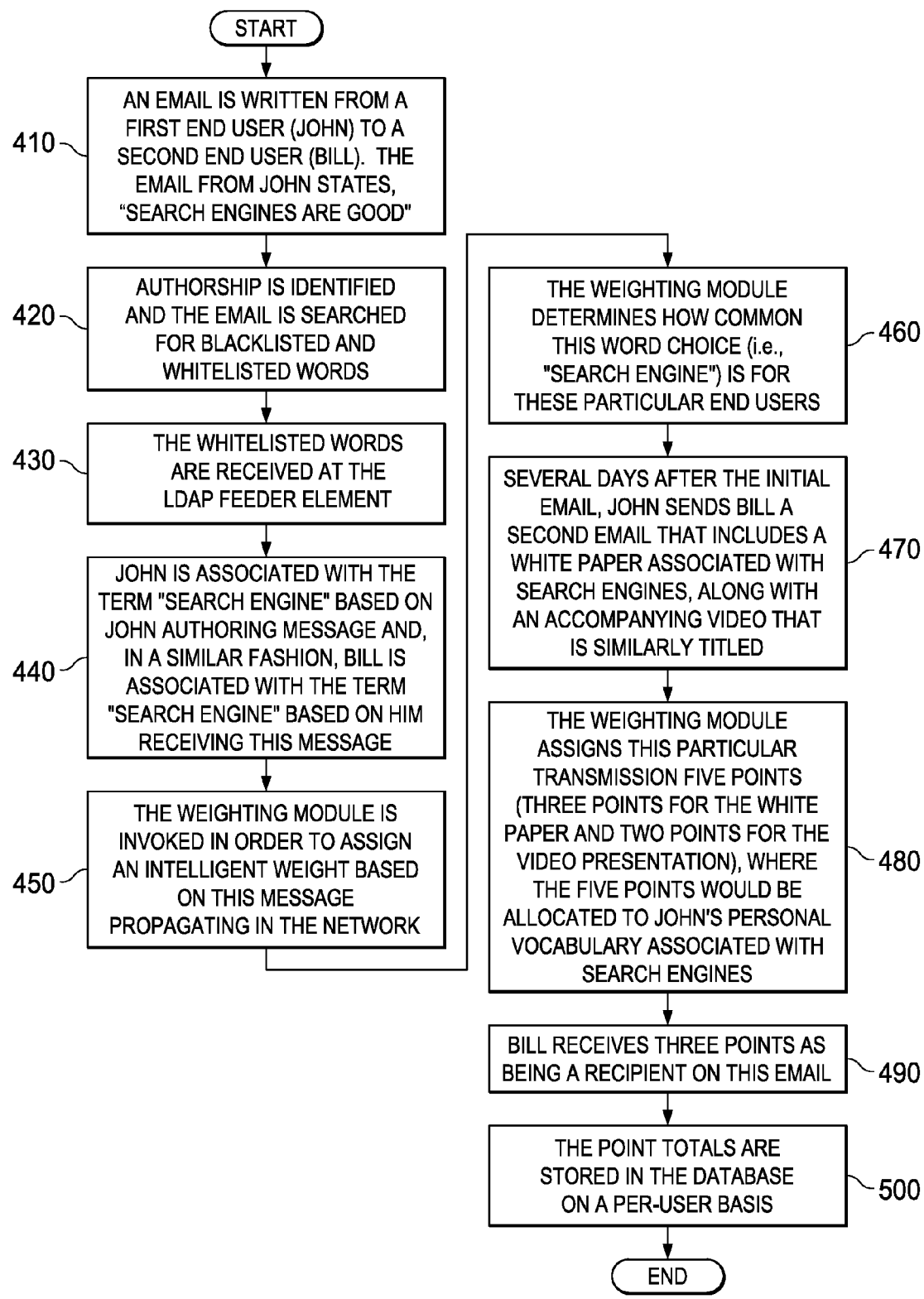

FIG. 5

| TERM | TOP USER 1 | TOP USER 2 | | | |
|---|---|---|---|---|---|
| TERM 1 | USER 1 | USER 2 | USER | USER | USER |
| TERM 2 | USER 5 | USER 1 | USER | USER | USER |
| N-P1 | USER 6 | USER 8 | USER | USER | USER |
| ⋮ | ⋮ | ⋮ | ⋮ | ⋮ | ⋮ |
| N-Pn | USER 1 | USER 10 | USER | USER | USER |

START

602 — EACH TERM IN THE VOCABULARY CAN BE MAINTAINED SUCH THAT IT CAN BE READILY SEARCHED

604 — RUN QUERY (QUERY = "TERM")

606 — CURRENT INDEX

REPEAT FOR ALL REMAINING USERS

608 — FACETING ON AUTHORS FIELD IS RAN

614 — THE AUTHORS ARE SORTED AND A NUMBER OF TOP AUTHORS ARE EXTRACTED

610 — EXPERTISE TAGS OF TOP AUTHORS ARE UPDATED WITH CURRENT QUERY TERM

612 — A PARTICULAR EXPERTISE TAG CAN BE ATTACHED TO SPECIFIC USER PROFILES

END

| USER 1 | TOP TERM 1 ↙94 | ...TOP TERM LAST | TERM | ... | TERM |
|---|---|---|---|---|---|
| USER 2 | TOP TERM 1 | ...TOP TERM LAST | TERM | ... | TERM |
| USER 3 | TOP TERM 1 | ...TOP TERM LAST | TERM | ... | TERM |
| ⋮ | ⋮ | ⋮ | ⋮ | ⋮ | ⋮ |
| USER N | TOP TERM 1 | ...TOP TERM LAST | TERM | ... | TERM |

SYSTEM AND METHOD FOR DERIVING USER EXPERTISE BASED ON DATA PROPAGATING IN A NETWORK ENVIRONMENT

TECHNICAL FIELD

This disclosure relates in general to the field of communications and, more particularly, to deriving user expertise based on data propagating in a network environment.

BACKGROUND

The field of communications has become increasingly important in today's society. In particular, the ability to effectively gather, associate, and organize information presents a significant obstacle: especially for component manufacturers, system designers, and network operators. Identifying potential experts can provide a practical resource that obviates the need to develop knowledge, which has already been accumulated and can be helpful to any business entity. As new communication platforms and technologies become available, new protocols should be developed in order to optimize the characterization of experts. Certain issues have arisen in data monitoring scenarios in which experts are sought to be identified. Hence, the ability to provide a viable data discovery mechanism for deriving experts presents a significant challenge to system designers, software engineers, and network operators alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified flowchart illustrating potential operations associated with one embodiment of the present disclosure;

FIG. 4 is a simplified flowchart illustrating potential operations associated with one embodiment of the present disclosure;

FIG. 5 is a simplified table illustrating a series of example users and terms associated with the communication system;

FIG. 6 is a simplified flowchart illustrating potential operations associated with one embodiment of the present disclosure;

DETAILED DESCRIPTION OF EXAMPLE EMBODIMENTS

Overview

A method is provided in one example and includes evaluating network traffic; identifying any type of data within the network traffic that is associated with a uniform resource locator (URL). This can include web page information, content, data directly relating to the URL itself, address information, etc. The method further includes identifying at least one condition associated with the URL; and classifying the URL as a transitional web page or as a valuable web page based on the condition. In this sense, the term classifying is meant to encompass any type of labeling, characterization, tagging, marking, branding, designation, storing, categorization, etc. Additionally, the terms 'transitional' and 'valuable' in this context are simply referring to one type of URL having an elevated value in comparison to the other. Such classifications can be subsequently used for additional purposes associated with expertise, as further discussed below.

In more specific implementations, the method may include storing a first URL in a transitional page list; storing a second URL in a valuable page list; and receiving a search query associated with expertise in a subject, where the valuable page list is evaluated in generating a response to the search query. The list can be provided in any type of table, queue, cache, repository, database, or any other suitable memory element. Additionally, the method can include determining an area of expertise for a user and a level of expertise for the user based on any of the elements provided in the transitional page list and the valuable page list.

Additionally, the method can include evaluating a transitional URL in the transitional page list; and reclassifying the transitional URL such that it is provided to the valuable page list. A condition can be associated with a time interval for which the URLs are accessed. The condition can also include social gestures, specific administrator provisioning or user settings (e.g., that manually classify a URL as valuable or transitional), or any other suitable condition (e.g., inclusive of a signature, an object, a tag, an identifier, etc.) that would assist in classifying a URL as either transitional or valuable. The condition can also relate to a context in which the URL was accessed. For example, the context can be associated with an e-mail transmission (e.g., where the URL was provided in the body of the e-mail, as an attachment, in the subject line, etc.). The method may also include providing a transitional URL to a blacklist after a number of times the transitional URL has been classified for inclusion in a transitional page list. In alternative embodiments, the method may include maintaining a hash table during a browsing session to determine if the condition has been satisfied for each uniform resource locator accessed during the browsing session.

Example Embodiments

Figure 1A:
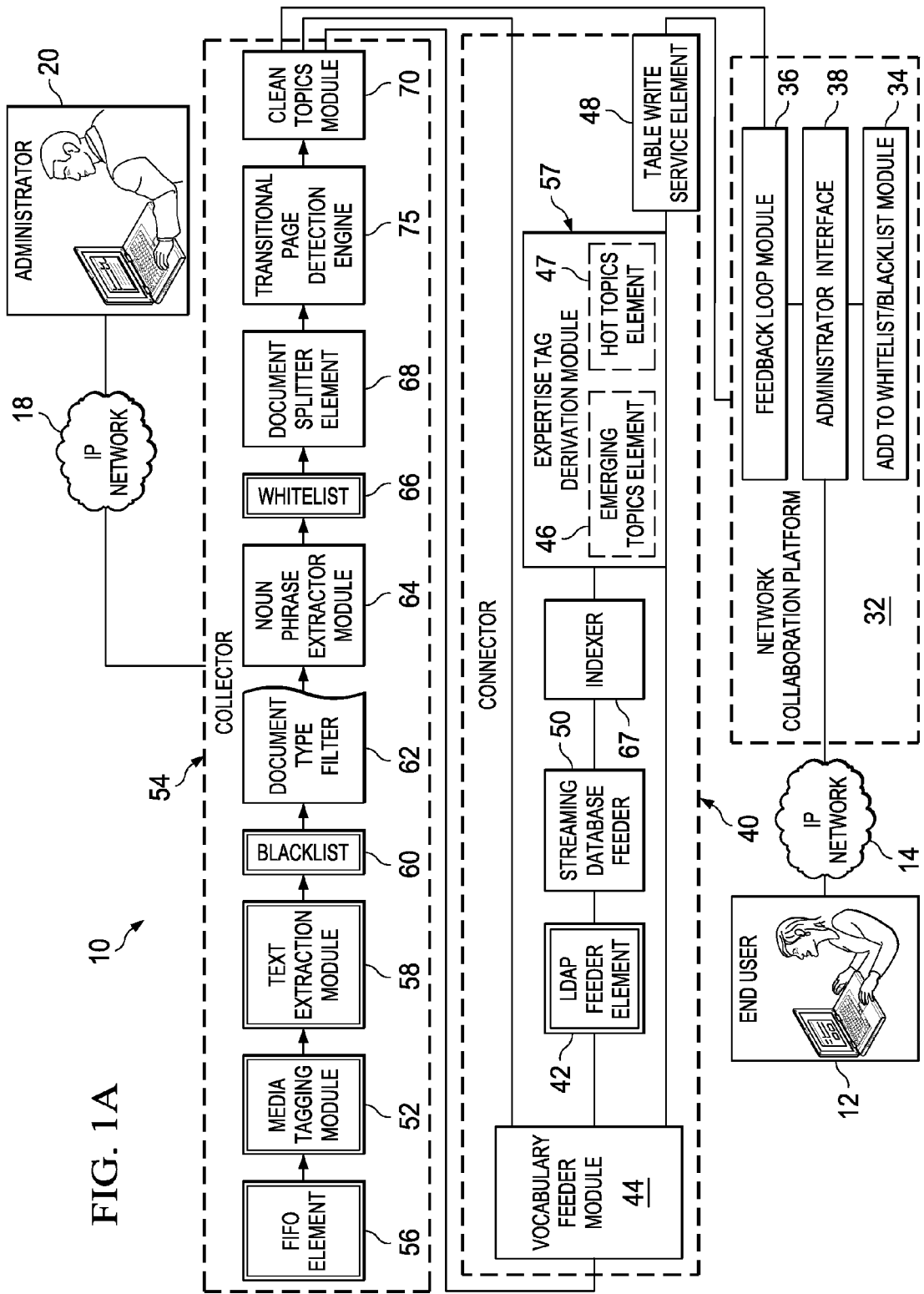
FIG. 1A is a simplified block diagram of a communication system for deriving user expertise based on data propagating in a network environment in accordance with one embodiment.

FIG. 1A is a simplified block diagram of a communication system 10 for deriving user expertise based on data propagating in a network environment. FIG. 1A may include an end user 12, who is operating a computer device that is configured to interface with an Internet Protocol (IP) network 14. In addition, an administrator 20 is provided, where administrator 20 has the ability to interface with the architecture through an IP network 18. In a particular embodiment, administrator 20 may act as end user 12 and both administrator 20 and end user 12 may have access to IP network 14 and to IP network 18. Communication system 10 may further include a network collaboration platform (NCP) 32, which includes an add to whitelist/blacklist module 34, a feedback loop module 36, and an administrator suggest interface 38. FIG. 1A may also include a connector 40, which includes a lightweight directory access protocol (LDAP) feeder element 42, a vocabulary feeder module 44, a table write service element 48, a streaming database feeder 50, an indexer 67, and an expertise tag derivation module 57. Expertise tag derivation module 57 may include an emerging vocabulary topics element 46 and a hot topics element 47.

FIG. 1A may also include a collector 54 that includes a first in, first out (FIFO) element 56, a media tagging module 52, a text extraction module 58, a blacklist 60, a document type filter 62, a noun phrase extractor module 64, a whitelist 66, a document splitter element 68, a clean topics module 70, and a transitional page detection engine 75. Multiple collectors 54 may be provisioned at various places within the network, where such provisioning may be based on how much information is sought to be tagged, the capacity of various network elements, etc.

In one example embodiment, communication system 10 tags users based on various network activities such as web browsing. As users browse web pages, communication system 10 tags the uniform resource locator (URL) that identifies a specific browsed web page (e.g., using a business vocabulary). The URL is a uniform resource identifier (URI) that can specify where a known resource (e.g., data or web page) is available and/or the mechanism for retrieving the resource. During the process of browsing, end user 12 can move from one web page to another. Certain web pages are offering data that may have pointers or links to web pages that end user 12 would like to access. These landing pages could be portal home pages like www.cisco.com, search result pages, etc.; however, such pages may have little value in identifying experts using communication system 10. For example, if end user 12 wants to watch a particular video on a particular internal website (e.g., www.cisco.com), then searches for particular videos can be initiated from the internal home page. A list of videos would be shown based on the search words, and end user 12 could pick the appropriate video. In order to watch the video, end user 12 had to go through various landing pages or "referrers" before reaching the actual page that had the video.

Typical user browsing patterns have proven that a web page or URL does not need be accessed through a direct visit; the web page or URL can be accessed through external referrers, within internal pages, and through search engines. For example, if end user 12 searches for "CAT 6K", the search would come back with a number of pages that refer to "CAT 6K." End user 12 may open the first few links in separate tabs and only find one web page that is valuable to them (i.e., a web page at which the individual devotes more time in comparison to others). If the end user's browsing behavior is fully captured (i.e., all the filtered pages that end user 12 accesses are tagged), the landing pages can have a negative impact in expert locator (inclusive of expert derivation) algorithms, or the tagged pages can cause unnecessary index space to be used as users who are not experts would be systematically identified as experts merely because they accessed the landing pages.

In accordance with certain embodiments, communication system 10 can be configured to process vocabulary filtered URLs for web pages that a given end user accesses. Each URL for a web page may be placed into one of two lists to assign a value to the captured URL (e.g., transitional state (low value) or valuable state (high value)). A transitional state can indicate that the URL may have been used for navigational purposes, or as a referrer (e.g., landing pages, portals pages, search engines, etc.). A valuable state can indicate that the URL may have been a web page where end user 12 ended their transitions or navigation (last web page accessed after multiple page hops). Note that the broad terms 'URL' and 'web page' are interchangeable and synonymous, as used herein in this Specification.

Furthermore, the amount of time spent at a URL can be used to determine the characterization of the state of the URL (e.g., transitional state or valuable state). For example, if end user 12 lands on a first web page, and quickly transitions to a second web page within a few seconds, then the URL for the first web page can be provided in a transitional page list. Also, if end user 12 lands on a first web page, switches to a second web page, moves back to the first web page, and then abruptly moves to a third web page, etc., then the URL for the first web page could also be provided in the transitional page list. In contrast, if end user 12 lands on a first web page, uploads/downloads content from the first web page, and continues to spend a certain amount of time (which can be a predetermined amount) on the first web page, then the URL for the first web page can be provided in a valuable page list. In a particular embodiment, placing URLs in a transitional page list can help identify web pages that have a low value for deriving user expertise based on data propagating in a network. Because web pages that have a low value for deriving user expertise are not used, a smaller and more accurate index of experts may be created.

In broader terms, the wisdom of the (network) crowd can be leveraged such that URLs can change state from a transitional state to a valuable state (or vice versa). For example, if URLx is in the transitional page list, but is accessed by a majority of users as a destination web page instead of transitional web page, then URLx can be moved to the valuable page list over time. Similarly, if URLx is currently in the valuable page list, but is accessed by a majority of users as a transitional page, then URLx can be provided in the transitional page list. Note that individual users (e.g., an administrator) can manually classify URLs as valuable or transitional in certain embodiments.

In particular scenarios in which a user leaves for coffee or is interrupted during a web page browse, the URL for the web page may be provided in the valuable page list because the user treated the web page like a web page where the user ended their transitions or navigation. However, if the web page is a transitional web page (e.g., used for navigational purposes or as a referrer), then the state of the URL for the web page can be changed (from valuable to transitional) based on the browsing of other system users. If most of the users use the web page as a re-direct/reference web page, then the state of the URL for the web page can be changed to transitional. In a particular embodiment, once a threshold is reached (e.g., 1000 instances, where a URL is designated as valuable or as transitional), the URL may be provided in whitelist 66 or blacklist 60 respectively. The URLs in blacklist 60 can be used to identify the low value (e.g., transitional) web pages. The URLs in whitelist 66 may be used to identify high value (valuable) web pages and, further, improve expertise locator algorithms.

Figure 1B:
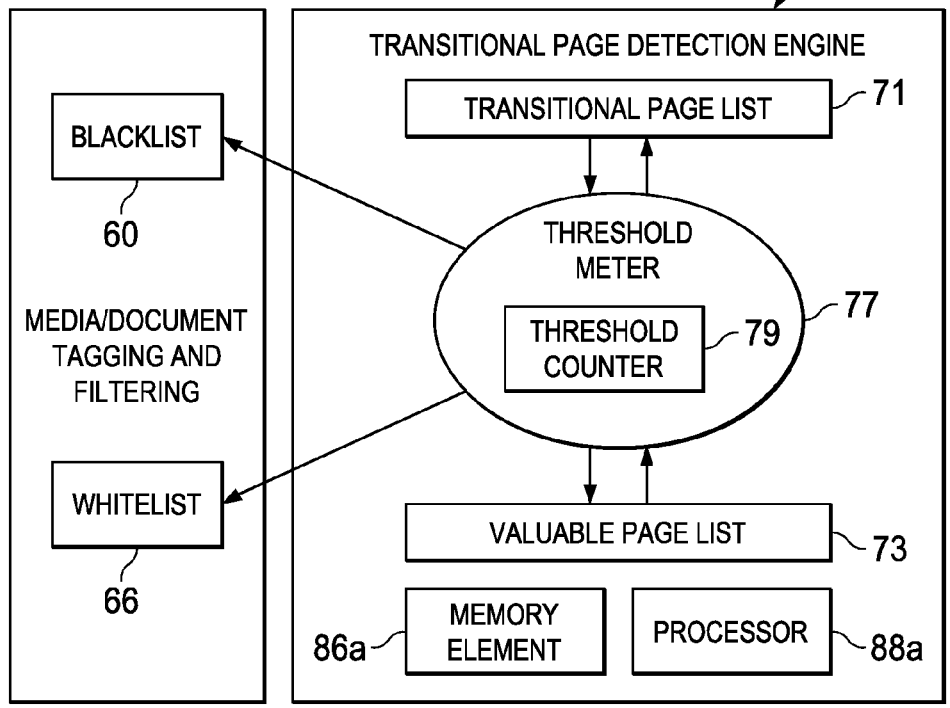
FIG. 1B is a simplified block diagram illustrating one possible implementation associated with discovering web pages in accordance with one embodiment of the present disclosure.

Turning to FIG. 1B, this particular example includes transitional page detection engine 75, along with blacklist 60 and whitelist 66 of FIG. 1A. In general terms, blacklist 60 and whitelist 66 can be included in any type of media/document tagging and filtering mechanism. Transitional page detection engine 75 further includes a transitional page list 71, a valuable page list 73, a threshold meter 77, a memory element 86a, and a processor 88a. In basic terms, transitional page detection engine 75 is configured to monitor user web behavior over a period of time to identify transitional (low value) web pages and valuable (high value) web pages. The term "web page" is a broad term, which is inclusive of any type of network content, web page, URL, blog, wiki element, etc. at which data can be accessed, reviewed, uploaded, managed, stored, or otherwise received. The URL can identify the web page, or provide a link to content.

In a particular embodiment, threshold meter 77 monitors the number of instances where a web page is designated as a valuable web page or a transitional web page. A threshold counter 79 may be associated with each URL in transitional page list 71 and in valuable page list 73. In a particular embodiment, threshold meter 77 may contain threshold counter 79 to record each time a web page is designated as a valuable web page or a transitional web page (e.g., in a URL hash table).

Once the threshold counter reaches a threshold, (e.g., 1000 instances where a web page is designated a valuable web page or a transitional web page) the URL for the web page may be provided in whitelist 66 or blacklist 60, respectively. The URLs in blacklist 60 can be used to identify the low value (e.g., transitional) web pages. The URLs in whitelist 66 may be used to further improve expertise locator algorithms, as detailed herein. The threshold can be configurable based on system requirements and traffic analysis. At regular intervals communication system 10 and/or administrator 20 may audit blacklist 60 and whitelist 66 to determine if URLs in blacklist 60 or whitelist 66 should be removed and/or added to blacklist 60 or whitelist 66. In this sense, any of the classifications being conducted by the platform can readily be modified, changed, or otherwise (manually) adjusted by a given user (e.g., an administrator, a network user, etc.).

In operation, each web page can be monitored, where the URL for the web page can be placed into either transitional page list 71 (low value state) or valuable page list 73 (high value state). Transitional page list 71 contains the URL of web pages that were used for navigational purposes or as referrers (e.g., portals pages, search engines, etc.). Valuable page list 73 can further include the URL of web pages at which the user ended their transitions or navigation (e.g., last web page accessed after multiple page hops).

For example, as shown in TABLE 1 below, for a registered user, the user behavior may be monitored such that at time T1, the user accessed URL1, at time T2, the user accessed URL2, and at time T3, the user accessed URL3. If the transition stops at URL3, then URL3 would be provided in valuable page list 73, whereas URL1 and URL2, would be provided in transitional page list 71. [Note that this example is representative of one session (defined by one domain per user).] Over a period of time, if the user behavior changes, then the states can be accordingly changed. For example, as shown in TABLE 2, URL2 may be removed from transitional page list 71 and added to valuable page list 73.

TABLE 1

| URL access with Timestamps |
| --- |
| T1  T2  T3  T4 |
| URL1  URL2  URL3  URL3 |

TABLE 2

| URL access with Timestamps |
| --- |
| T1  T2  T3  T4 |
| URL1  URL2  URL2  URL2 |

To determine the state of the web page (transitional or valuable), the amount of time spent at the web page can be considered. For example, if a user lands on a first web page, and then jumps to a second web page within few seconds, then the URL for the first web page would be provided in transitional page list 71. In addition, if user lands on the first web page, jumps to the second web page, then goes back to the first web page, jumps to a third web page, etc., then the URL for the first web page may be provided to transitional page list 71 (i.e., delivered to, sent to, populated to, provisioned in a table, etc.). Alternatively, if a user lands on the first web page, uploads/downloads content from the first web page, and then the user spends more than a threshold amount of time on the first web page, then the URL for the first web page may be provided to valuable page list 73. The threshold amount of time can be configurable based on system requirements and traffic analysis and, further, may be any amount of time that would allow a web page to be properly classified as transitional or valuable.

In a particular embodiment, social gestures can also be used to determine the importance of a page. For example, if a user accesses content of a page (copy/paste) in an email, then the importance of the page increases. If a user refers to a page in the email, then the importance of the page would similarly increase. Additionally, using such social gestures, web pages can be rated. If the rate moves higher than a maximum threshold, then the URL for the web page can be provided in valuable page list 73. If the rate drops below a certain minimum threshold, then the URL for the web page can be provided in transitional page list 71. Many different social gestures may be used to determine the importance of a page and, further, the social gestures may be equally weighted, or some may be weighted more than others. For example, downloading data from the web page may be weighted more than clicking a link on the web page.

The following example describes how web pages (or the URL for the web pages) during one session (e.g., one domain per user) are classified as "transitional" or "valuable." For example, if a user wants to watch a video and the user knows the exact URL of the video (e.g., URL1), then the user can type the URL on a web browser (@ t1=10:28 AM). The end user may be directed to the video without any hops. In this example, the user does not perform additional activities (i.e., no URL change in the same session) such that the video URL gets recorded and placed into a hash table associated with a valuable state. TABLE 3 below illustrates a valuable state hash table, which contains the URL. After the session is over, the URL can be added to valuable page list 73. Because the visit to the URL was a direct visit to watch the video in this instance, the user would stay on the web page for more than just few seconds. There would be a thread running at a predetermined interval (e.g., every minute) to check if the predetermined interval has passed (e.g., one minute has passed).

TABLE 3

URL List Hash Map with Timestamp

URL 1 @ t1 = 10:28 am
(direct cvision site)

In a particular embodiment, the interval can be determined by recording a last timestamp matched against the URL (in this case, t1) minus a current timestamp. If the interval is longer than the predetermined interval (e.g., a minute), then the URL would be provided in valuable page list 73 and a counter for the URL (e.g., URL1) may be increased by one. In a particular embodiment, the current browsing history is stored in a current URL list hash table and at the end of the browsing session, or when a web page is designated as a valuable web page, the current URL list hash table may be flushed to save resources.

In an alternative example, shown in TABLE 4, a user can watch a video by first visiting a home web page (URL1@ t1) (e.g., www.cisco.com), then clicking on a specific section (URL2@t2), (e.g., Engineering Section). A search may be performed using keywords, where search results may be returned with a list of videos (URL4@t4). The video that the user seeks to watch (URL5@t5) may be selected.

TABLE 4

URL List Hash Map with Timestamp (Search Engine)

URL 1 @ t1 = 10:28 am
wwwin.cisco.com
URL 2@ t2 = 10:28:30 am
wwwin.cisco.com/eng
URL3@ t3 = 10:28:45 am
cvision search page
URL4@ t4 = 10:29:20 am
cvision search result
URL5@ t5 = 10:29:45 am
video page In this example, when the URL1 is accessed at t1=10:28 AM, the timer thread can be invoked at 10:28:00 AM. After a predetermined interval (e.g., one minute), the thread can wake up to check if the predetermined interval has elapsed between the last entry and the current time. At 10:29:00 AM, a transitional state hash table (TABLE 5) may have URL3 inserted at t3=10:28:45 AM. The difference is not met the predetermined interval (e.g., only fifteen seconds) and, therefore, the timer would again sleep for the predetermined interval (e.g., minute). At 10:30:00 AM, the timer can be invoked again, but since only another 15 seconds have elapsed from the last entry (URL5), the timer would sleep again. At 10:31:00 AM, the time difference from last entry and current time would be over the predetermined interval (e.g., one minute) and, hence, URL5 can be provided in valuable state hash table (TABLE 6). At the end of the browsing session, URL5 can be added to valuable page list 73 and URL1, 2, 3, and 4 can be added into transitional page list 71.

TABLE 5

Transitional State Hash Table

| URL | Count |
|---|---|
| URL1 | 1 |
| URL2 | 1 |
| URL3 | 1 |
| URL4 | 1 |

TABLE 6

Valuable State Hash Table

| URL | Count |
|---|---|
| URL5 | 1 |

If a given set of search results are opened in multiple tabs, (where TABLE 7 is a first tab and TABLE 8 is a second tab), then the action by the user may be interpreted as another browsing session (i.e., another domain for that user). For example, once the user has landed on URL4 (search result page), another tab can be opened to watch the video. In this case, a new second URL list hash table may be created, where the first URL list has a table contains URLs1, 2, 3, and 4. The first URL list hash table ends at URL4. After the predetermined time period, (e.g., one minute) URL4 can be put in valuable page list 73, and URLs1, 2, and 3 can be put in transitional page list 71, and the first URL hash list may be flushed. Similarly, after the predetermined amount of time, the URL5 in the second URL hash table can be provided in valuable page list 73, and the second URL hash list may be flushed.

TABLE 7

URL List Hash Map
(ends at Cvision search results)

URL 1 @ t1 = 10:28 am
wwwin.cisco.com
URL 2@ t2 = 10:28:30 am
wwwin.cisco.com/eng
URL3@ t3 = 10:28:45 am
cvision search page
URL4@ t4 = 10:29:20 am
cvision search result

TABLE 8

URL List Hash Map
(video opened in new tab)

URL5@ t5 = 10:29:45 am
video page

Figure 1C:
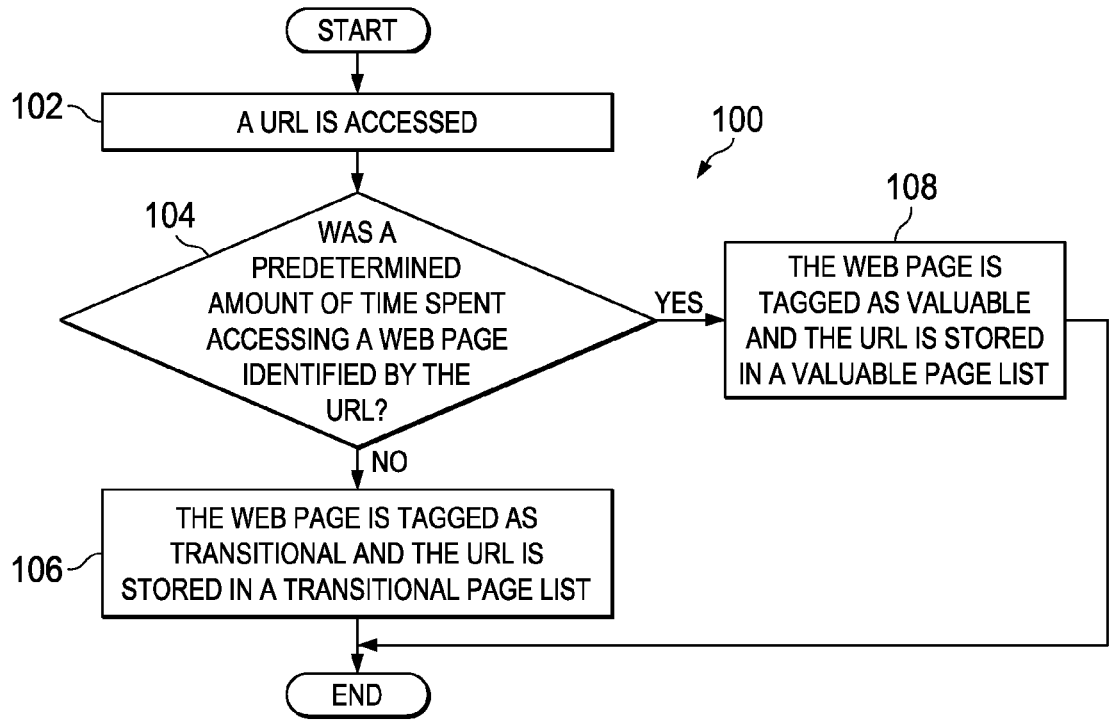
FIG. 1C is a simplified flowchart illustrating potential operations associated with one embodiment of the present disclosure.

Turning to FIG. 1C, FIG. 1C is a simplified flowchart 100 illustrating example activities associated with classifying URLs based on data propagating in a network environment. At 102, a URL is accessed by any network user. The URL may identify a web page, web content, etc. At 104, communication system 10 determines if a predetermined amount of time was spent accessing a web page identified by the URL. For example, communication system 10 may determine if one minute was spent accessing a web page identified by the URL. If communication system 10 determines that a predetermined amount of time was not spent accessing the URL, then the web page identified by the URL is tagged as transitional, and the URL is stored in a transitional page list, as is illustrated in 106. For example, the URL for the web page may be added to transitional page list 71.

In cases where the architecture determines that a predetermined amount of time was spent accessing the URL, then the web page identified by the URL can be tagged as valuable, and the URL is subsequently stored in a valuable page list, as is illustrated in 108. For example, the URL for the web page may be added to valuable page list 73. In this manner, the topics of interest and the area of expertise for end user 12 can (at least partially) be determined using the URLs in valuable page list 73. In addition, other suitable mechanisms may be used to determine the topics of interest and the area of expertise for end user 12, for example, by building a personal vocabulary for end user 12. Before turning to additional operational capabilities of communication system 10, the vocabulary development is discussed below.

In generating a large corpus of vocabulary words, several issues arise in the context of locating experts based on keyword queries. Communication system 10 can offer an intelligent filtering of words in order to identify potential experts. In one particular example, communication system 10 can automatically derive 'expertise tags' (e.g., topics that may be part of someone's domain of expertise) using an expertise location system and related statistics. The actual tags can be developed by expertise tag derivation module 57. In operational terms, an expertise location interface (e.g., administrator interface 38) can be used to query a corpus (i.e., a dataset) of information related to users of a system to determine experts for a particular search query. A response to the search query can include any type of identifier for the user being identified with a particular expertise. For example, the user identifier in the response can include a user ID, an e-mail address, an IP address, a first and/or last name, an employee identifier, etc.

Relevant words can be chosen to suggest 'expertise tags', which can offer topics that may reflect respective areas of expertise for corresponding users. Commonly, only a small percentage of users appropriately tag themselves (e.g., manually add a tag to their corresponding work profile). This results in a poor representation of possible experts within an organization. Communication system 10 can address this issue by automatically deriving user expertise based on existing data that propagates in a network. In regards to potential sources for the tags, when given the corpus of data, communication system 10 can be configured to examine network data to find words/noun phrases that are frequently used. Any suitable method can be used to mine the corpus of data (e.g., using syntactic analysis, counting word occurrence patterns, etc.). If a set of allowed words is previously known, then the occurrences of these words can be counted using any appropriate mechanism (e.g., streaming databases, standard databases, etc.).

Additionally, where the data is observed over a period of time, using emerging topics element 46, communication system 10 can determine topics that are emerging. 'Emerging' in this context can mean that initially, only a few occurrences appear in the corpus of data for a given set of words, but over time, the words become more prominent and/or popular. Such a scenario is typical for companies offering new products, or engaging in new services, projects, etc.

Note that as users generate search queries for experts, communication system 10 can aggregate the counts for each unique query over time. An inference can be made that the most used query terms would most probably represent topics of interest to a majority of users. Given the sets of topics, each topic can be maintained and, further, a set of experts for any particular topic can be readily identified. Each tag in a given data list can be representative of an expertise tag to be used for identifying the top experts in the organization. Any suitable type of threshold can be applied to select the 'best' expert out of the experts being returned by the system (e.g., score-based mechanisms [inclusive of peer review], percentage based (top 10%), weighting algorithms, feedback information, etc.).

In operation, a portion of the expert derivation can be performed regularly (e.g., daily), where new expertise tags are presented to an administrator 20 for approval. For example, this ratification could symbolize a promotion of a particular expertise tag into end user's 12 profile. The expertise can be part of the relevant aggregated vocabulary terms (e.g., groups of keywords for a networking company could include routing, switching, deep packet inspection, etc.). Note that the set of hot topics does not have to belong to the vocabulary term set. The hot topics could include any word (or term, or group of words), since the hot topics module is used to derive new suggestions for the vocabulary terms.

Expertise tag derivation module 57 can be used to generate a set of users deemed to have relevant expertise on certain topics. This number of topics can be readily configurable by administrator 20. Expertise tag derivation module 57 can also generate a set of topics (expertise tags) for each user. Any of this possible expertise classification (or simple identification) can be included in a user's profile (e.g., in a querying or pull model). Using hot topics element 47, a set of hot topics per user can also be generated by expertise tag derivation module 57, where this number is also configurable by administrator 20. This can further be used in a managerial view (e.g., for an end user, or for an administrator) to illustrate the user's top topics of interaction (e.g., pull model). A set of hot topics per system (e.g., per business segment) can also be generated, where this number is also configurable by administrator 20. Furthermore, this can be used by an analytics module to display the top topics in the enterprise (e.g., pull model)

Note that there are several acceptable ways in which such tags can be derived. Depending on system-level architectural choices, various acceptable methodologies can be used to account for performance, memory, and central processing unit parameters. For example, one type of solution may make use of database technologies (e.g., Attivio, Truviso, etc.). Such solutions may be used in processing blocks associated with connector 40. Additional details related to expertise derivation activities are provided below with reference to FIGS. 2-11. Before turning to those details, some primary information is offered related to how the underlying network data is aggregated, developed, and analyzed.

Communication system 10 can intelligently harvest network data from a variety of end users, and automatically create vocabulary by observing each user's interaction/traffic on the network. In a general sense, the architecture can isolate terms per person in order to define an end user's personal vocabulary. This information can subsequently be used to identify specific experts. Communication system 10 can intelligently and dynamically auto generate different lists of personal vocabulary per user without creating additional overhead for the end users.

As part of its vocabulary development activities, communication system 10 can tag words for specific end users (e.g., end user 12). For example, relevant words identified in an enterprise system can be extracted from the documents that are flowing through the network. The tags can be categorized and then associated to end user 12, who generated or who consumed each document. In accordance with one example implementation, a tag can be given different weights depending on several potential document characteristics. [Note that the term 'tag' as used herein in this Specification is meant to connote any type of identifier (inclusive of a field, an object, a marker, a flag, etc.) that can be used in conjunction with communication system 10.] One characteristic relates to the type of document propagating in the network (for example, email, an HTTP transaction, a PDF, a Word document, a text message, an instant message, etc.). Another characteristic relates to the type of usage being exhibited by end user 12. For example, the system can evaluate if end user 12 represents the producer of the content (e.g., the sender, the poster, etc.), or the consumer of the content (e.g., the recipient, the audience member, etc.). In one example, if end user 12 were posting a document including the identified vocabulary, the act of posting such words would accord the words a higher weight than merely receiving an email that includes the particular vocabulary words. Stated in different terms, in a forum in which end user 12 is authoring a document to be posted (e.g., on a blog, on a corporate website, in a corporate engineering forum, etc.), vocabulary words within that document would have a higher associative value than if the words were propagating in lesser forums (e.g., a passive recipient in an email forum). Yet another characteristic relates to a probability of a term showing up in a document. (Note that multiple word terms have a lower probability of occurrence and, therefore, carry a higher weight when they are identified). In one instance, the tagged vocabulary words can be aggregated using streaming databases, where the aggregated tags can be stored and archived in a summarized format.

The resulting information may be suitably categorized in any appropriate format. For example, a dynamic database (e.g., table, list, etc.) can be generated for each individual user, each user-to-user communication (e.g., 1-1, N or N, etc.), and each type of document (e.g., email, phone conversation messages, Meeting Place meeting data, WebEx data, blog posting, White Paper, PDF, Word document, video file, audio file, text message, etc.). Essentially, any type of information propagating in the network can be suitably categorized in the corresponding database of the tendered architecture. Some of the possible database configurations are described below with reference to FIG. 2.

It should be noted that there are several different types of objects flowing through the architecture of communication system 10. Components within communication system 10 can identify which objects should be processed by particular components of the configuration. In operation of an example that is illustrative of business vocabulary being developed, at vocabulary feeder module 44, data can be sent by noun phrase extractor module 64, (i.e., the content field) and this can be used for vocabulary suggestion for administrator 20. This data can be anonymous, having no user concept. For LDAP feeder element 42, whitelisted terms are provided (from whitelist 66) and, further, this can be used for personal vocabulary building, as discussed herein. In essence, this data belongs to a particular user (e.g., end user 12); it is a document associated to a user. Thus, there are two distinct workflows occurring in the architecture, which processes different types of documents for different purposes.

Another aspect of the architecture involves a noun phrase extraction component, which can be provided along with filtering mechanisms, and stream access counts to retrieve popular and/or new vocabulary terms. In one example implementation, involving the development of business vocabulary, the architecture can suggest words and phrases that are potential vocabulary candidates. Multi-word phrases can be given more weight than single word terms. The decision whether to include these words in whitelist 66 or the blacklist 60 can rest with administrator 20 and/or transitional page detection engine 75. Administrator 20 can also decide if the words should never be brought to his attention again by marking them for addition to the list of administrator stop words. This can take the form of a feedback loop, for example, from the NCP user interface to the network sensor/central engine (depending on where the stop word removal component may reside).

In one example embodiment, only a certain domain of data (e.g., words) of vocabulary is tagged. As used herein in this Specification, the term 'data' is meant to encompass any information (video, text, audio, multimedia, voice, etc.) in any suitable format that propagates in a network environment. The particular domain could be provided in a whitelist, which reflects specific network content. In one example implementation, administrator 20 can develop a certain domain that respects privacy issues, privileged content, etc. such that the ultimate composite of documents or files would reflect information capable of being shared amongst employees in a corporate (potentially public) environment. In certain implementations, the resultant composite of documents (i.e., data) can help to identify experts associated with specific subject matter areas; however, there are a myriad of additional uses to which communication system 10 can apply. As used herein in this Specification, the term 'resultant composite' can be any object, location, database, repository, server, file, table, etc. that can offer administrator 20 the results generated by communication system 10.

Communication system 10 can harvest network data from a variety of end users, and automatically create personal vocabulary from business vocabulary by observing each user's interaction/traffic on the network. In a general sense communication system 10 is constantly extracting keywords based on the traffic end user 12 is sending and receiving on the network and the architecture can isolate terms per person in order to define an end user's personal vocabulary. This information can subsequently be used to identify specific experts.

End user's 12 personal vocabulary can be based on the number of occurrences a specific term is seen in the network (e.g., over a period of time) and end user's 12 expertise may be calculated per term. The expertise can be independent of the other users in the system and, further, can be reflective of end user's 12 individual activity on those terms. In a particular embodiment, an expertise metric may be more complex, and may be provided relative to the activity of the other users in the system, along with the recentness of the activity and the relevance to a specific term. While calculating the expertise for end user 12 for a specific business-related term, the system develops a list of relevant documents for that term, lists the authors of those documents, and ranks them based on relevancy scores. Any individual whose score is above a system-defined threshold, could join an expert set. Note that even though a user may be designated as being in the expert set, users of the expert set could still vary in their expertise level based on their scores.

Turning to the infrastructure of FIG. 1A, IP networks 14 and 18 represent a series of points or nodes of interconnected communication paths for receiving and transmitting packets of information, which propagate through communication system 10. IP networks 14 and 18 offer a communicative interface between servers (and/or end users) and may be any local area network (LAN), a wireless LAN (WLAN), a metropolitan area network (MAN), a virtual LAN (VLAN), a virtual private network (VPN), a wide area network (WAN), or any other appropriate architecture or system that facilitates communications in a network environment. IP networks 14 and 18 can implement a TCP/IP communication language protocol in a particular embodiment of the present disclosure; however, IP networks 14 and 18 may alternatively implement any other suitable communication protocol for transmitting and receiving data packets within communication system 10.

Note that the elements of FIG. 1A-1B can readily be part of a server in certain embodiments of this architecture. In one example implementation, collector 54, connector 40, and/or NCP 32 are (or are part of) network elements that facilitate or otherwise helps coordinate the URL classification operations, as explained herein. As used herein in this Specification, the term 'network element' is meant to encompass network appliances, servers, routers, switches, gateways, bridges, loadbalancers, firewalls, processors, modules, or any other suitable device, proprietary component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. Note that each of collector 54, connector 40, and/or NCP 32 can be provisioned with their own dedicated processors and memory elements (not shown), or alternatively the processors and memory elements may be shared by collector 54, connector 40, and NCP 32.

In one example implementation, connector 40 and/or collector 54 includes software (e.g., as part of transitional page detection engine 75, expertise tag derivation module 57, etc.) to achieve the URL classification operations, as outlined herein in this document. In other embodiments, this feature may be provided externally to any of the aforementioned elements, or included in some other network device to achieve this intended functionality. Alternatively, several elements may include software (or reciprocating software) that can coordinate in order to achieve the operations, as outlined herein. In still other embodiments, any of the devices of FIG. 1A may include any suitable algorithms, hardware, software, components, modules, interfaces, or objects that facilitate the URL classification operations. Additional operational capabilities of communication system 10 are detailed below.

Figure 1D:
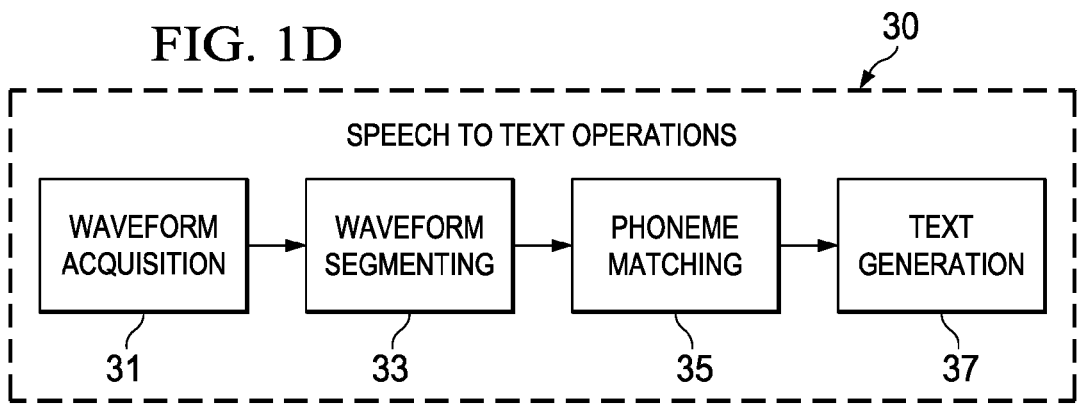
FIG. 1D is a simplified schematic diagram of speech-to-text operations that can be performed in the communication system in accordance with one embodiment of the present disclosure.

Turning to FIG. 1D, FIG. 1D is a simplified schematic diagram illustrating a number of speech-to-text operations 30 that may occur within communication system 10. In one implementation, the speech-to-text operations are part of text extraction module 58. The speech-to-text conversion can include a number of stages. For example, waveform acquisition 31 can sample the analog audio waveform. Waveform segmentation 33 can break the waveform into individual phonemes (e.g., eliminating laughter, coughing, various background noises, etc.). Phoneme matching 35 can assign a symbolic representation to the phoneme waveform (e.g., using some type of phonetic alphabet). In addition, text generation 37 can map phonemes to their intended textual representation (e.g., using the term "meet" or "meat"). If more than one mapping is possible (as in this example), a contextual analysis can be used to choose the most likely version.

In operation, media tagging module 52 can be configured to receive a media file (video, audio, etc.) and transform that information into a text tagged file, which is further passed to a document indexing function. More specifically, and in one example implementation, there is a separate workflow that occurs before text extraction activities are performed. This separate workflow can address media files, which may undergo some type of conversion from audio to text. For example, if a video file were to be received, audio information would be identified and, subsequently, converted to text information to identify relevant enterprise vocabulary. An audio stream can be converted to a phonetic index file (i.e., a phonetic audio track). Once the phonetic index file is created, an enterprise vocabulary can be applied to search for enterprise terms within this phonetic index file. In one instance, the enterprise vocabulary may include one or more whitelist words, which can be developed or otherwise configured (e.g., by an administrator).

Applying the enterprise vocabulary can include, for example, taking each word within the enterprise vocabulary and searching for those particular words (e.g., individually) in the audio track. For example, for an enterprise vocabulary of 1000 words, a series of application program interfaces (APIs) can be used to identify that a given word ("meet") is found at specific time intervals (T=3 seconds, T=14 seconds, T=49 seconds, etc.). The resultant could be provided as a list of 40 words (in this particular example).

This list can be checked against a personal vocabulary database, which is particular to the end user who is seeking to send, receive, upload, etc. this media file. Thus, the personal vocabulary (e.g., having 250 words) can be loaded and leveraged in order to eliminate false positives within the 40 words. This could further reduce the resultant list to 25 words. A resulting text file can be fed to text extraction module 58 for additional processing, as outlined herein.

Figure 1E:
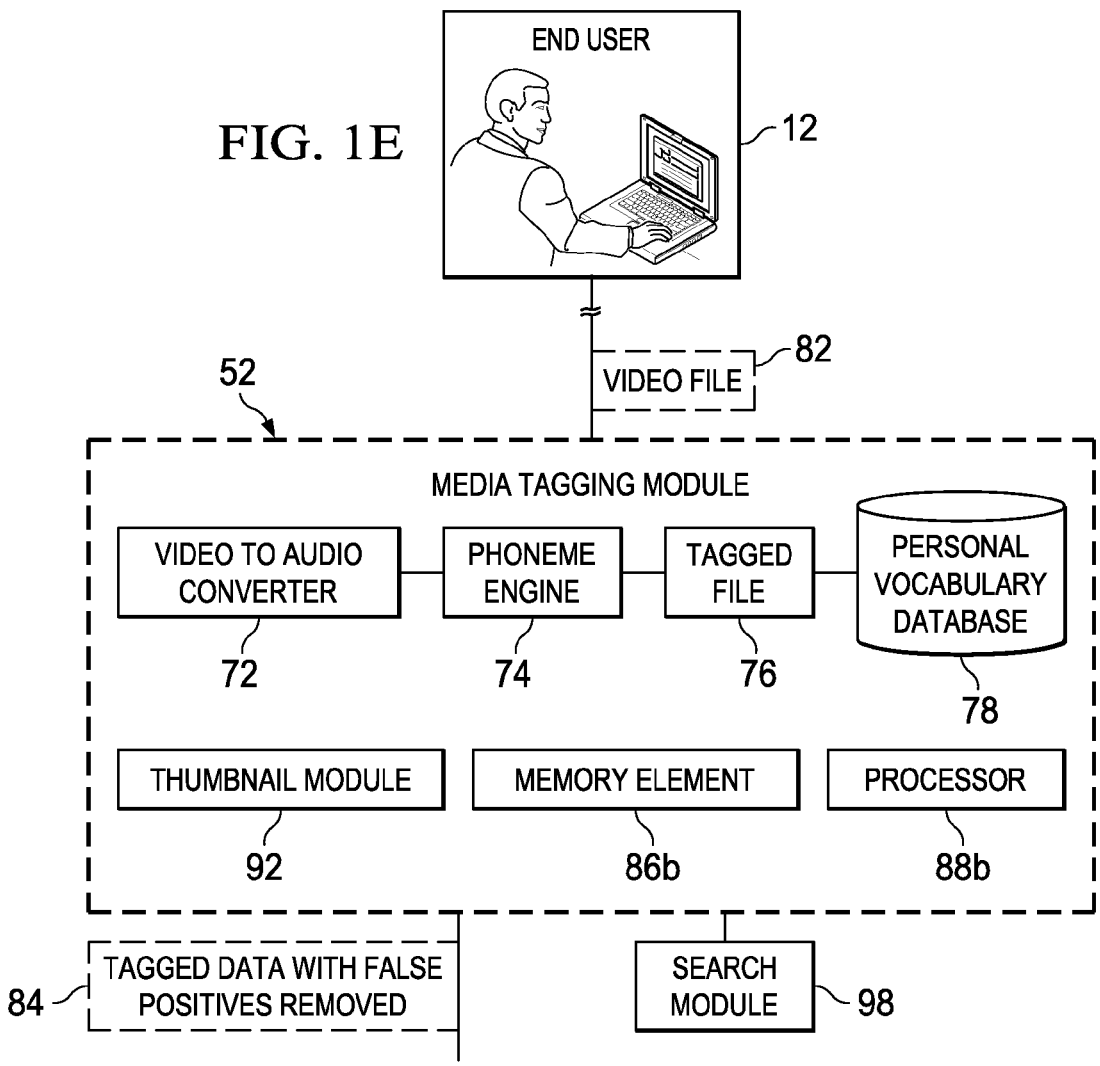
FIG. 1E is a simplified block diagram of a media tagging module in the communication system in accordance with one embodiment of the present disclosure.

FIG. 1E is a simplified block diagram that illustrates additional details relating to an example implementation of media tagging module 52. Media tagging module 52 may include a video-to-audio converter 72, a phoneme engine 74, a tagged file 76, a thumbnail module 92, a memory element 86b, a processor 88b, and a personal vocabulary database 78. A raw video file 82 can be sought to be uploaded by end user 12, and it can propagate through media tagging module 52 in order to generate tagged data with false positives removed 84.

Additionally, a search module 98 is also provided in FIG. 1E and this element can interact with media tagging module 52 in order to search information that has already been intelligently filtered using the various mechanisms outlined herein. For example, a search interface could be provided (to a given end user) and the interface could be configured to initiate a search for particular subject areas within a given database. The removal of false positives can occur at an indexing time such that when an end user provides a new search to the system, the database is more accurate and, therefore, a better search result is retrieved.

In the context of one example flow, media can be extracted from HTTP streams, where it is subsequently converted to audio information. The audio track can be phonetic audio track (PAT) indexed. Appropriate tags can be generated and indexed, where thumbnails are transported and saved. Queries can be then served to the resulting database of entries (e.g., displayed as thumbnails), where relevant video and audio files can be searched. Duplicate video entries can be removed, modified, edited, etc. on a periodic basis (e.g., by an administrator, or by some other individual). In addition, the appropriate video or audio player can offer a suitable index (e.g., provided as a "jump-to" feature) that accompanies the media.

Speech recognition can be employed in various media contexts (e.g., video files, Telepresence conferences, phone voicemails, dictation, etc.). In addition, any number of formats can be supported by communication system 10 such as flash video (FLV), MPEG, MP4, MP3, WMV, audio video interleaved (AVI), MOV, Quick Time (QT) VCD, MP4, DVD, etc. Thumbnail module 92 can store one or more thumbnails on a platform that connects individual end users. The platform could be (for example) used in the context of searching for particular types of information collected by the system.

Figure 2:
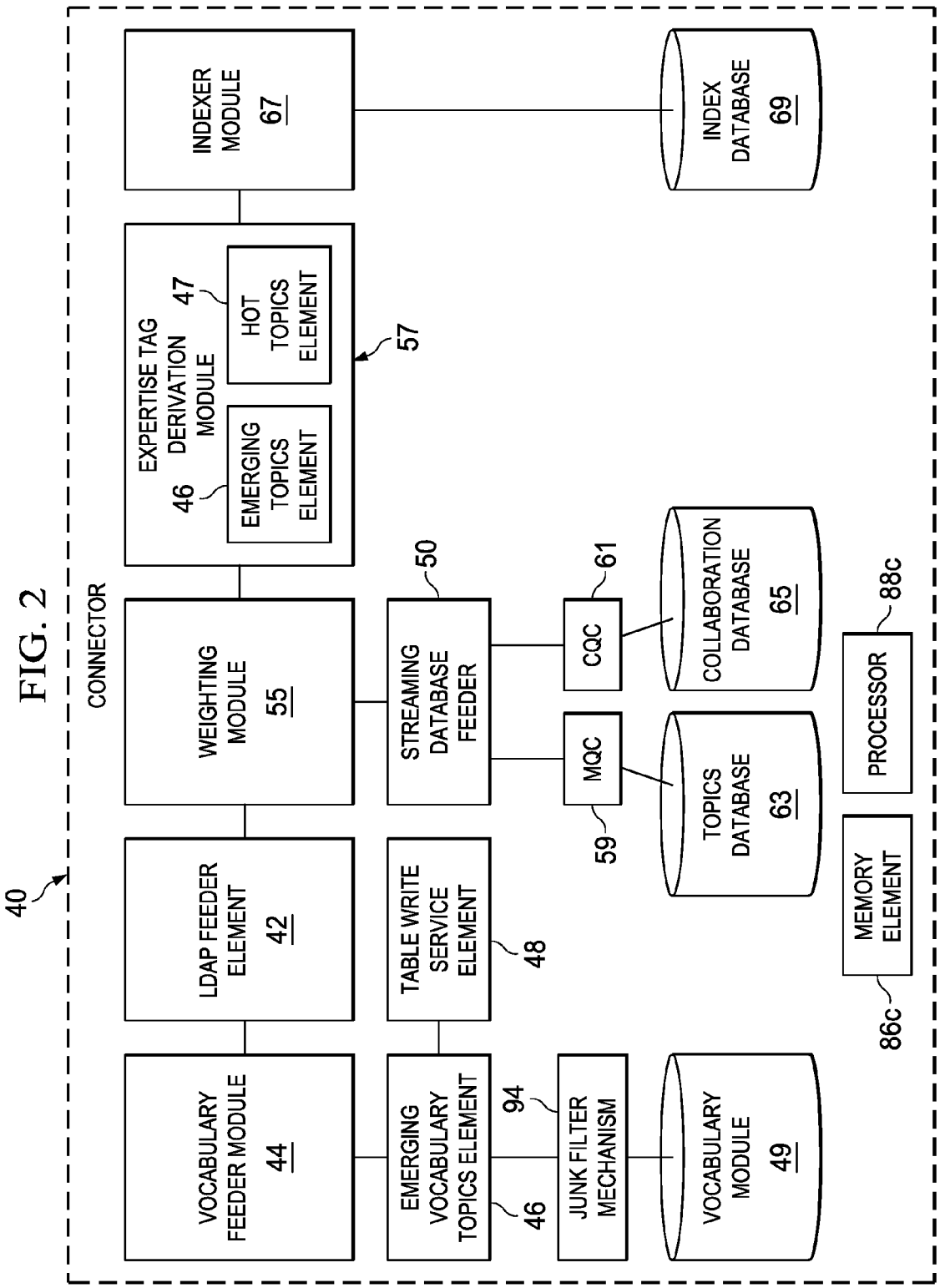
FIG. 2 is a simplified block diagram of a connector in the communication system in accordance with one embodiment of the present disclosure.

Turning to technical details related to how the personal vocabulary can be developed. FIG. 2 is a simplified block diagram of an example implementation of connector 40. In this particular configuration, connector 40 includes a memory element 86c, and a processor 88c. Connector 40 also includes expertise tag derivation module 57, a junk filter mechanism 94 (which may be tasked with removing erroneous vocabulary items), a vocabulary module 49, a weighting module 55, a streaming database feeder 50, emerging topics element 46, hot topics element 47, a hot a MQC 59, a CQC 61, a topics database 63, a collaboration database 65, an indexer module 67, and an index database 69. Indexer module 67 is configured to assist in categorizing the words (and/or noun phrases) collected in communication system 10. Those indices can be stored in index database 69, which can be searched by a given administrator or an end user in querying for particular experts. [Note that any type of search interface can be used to generate the search query, where such interfaces may be provided in a computer being used by end user 12, administrator 20, etc. For example, the search interface could simply be a link, an application, or some type of software: all of which could be used to communicate queries to some type of database (e.g., memory element).]

Along similar reasoning, topics database 63 can store words associated with particular topics identified within the personal vocabulary. Collaboration database 65 can involve multiple end users (e.g., along with administrator 20) in formulating or refining the aggregated personal vocabulary words and/or noun phrases. In regards to vocabulary module 49, this storage area can store the resultant composite of vocabulary words (e.g., per individual), or such information can be stored in any of the other databases depicted in FIG. 2. It is imperative to note that this example of FIG. 2 is merely representing one of many possible configurations that connector 40 could have. Other permutations are clearly within the broad scope of the tendered disclosure.

In operation of an example for deriving expertise, consider an instance where the most used topics in the corpus of data is router and IP networks, where the term 'MPLS' is being used the most by querying users, and where the emerging topic is Telepresence. The list of candidate tags could be provided as router, IP networks, MPLS, and Telepresence. Communicating these terms to an interface of the expertise derivation mechanism (e.g., end user 12 or administrator 20 interfacing with connector 40) would offer the following results:

router→all employees in the routing company
'IP networks'→Expert1 (score 100), Expert2 (score 90), Expert3 (score 10)
'MPLS'→Expert4
'Telepresence'→Expert5.

The first term is simply too broad and it does not provide any filtering for this particular query. The term 'IP networks' can be suggested as a topic of expertise to Expert1 and to Expert2, but Expert3 can be dropped because his retrieved score is too low with respect to the other two (i.e., potentially better) experts. In a similar fashion, the term 'MPLS' can be suggested to Expert4 and the term 'Telepresence' to Expert5.

In regards to a different (underlying) data collection activity, suitable filtering and processing operations can be performed on collector 54, where those results may be provided to connector 40 for identifying potential areas of expertise and to connector 40 for building personal vocabulary. With respect to the initial text stripping operations, noun phrase extractor module 64 can find the noun phrases in any text field. In more specific implementations, pronouns and single words are excluded from being noun phrases. A noun phrase can be part of a sentence that refers to a person, a place, or a thing. In most sentences, the subject and the object (if there is one) are noun phrases. Minimally, a noun phrase can consist of a noun (e.g., "water" or "pets") or a pronoun (e.g., "we" or "you"). Longer noun phrases can also contain determiners (e.g., "every dog"), adjectives (e.g., "green apples") or other preceding, adjectival nouns (e.g., "computer monitor repair manual"), and other kinds of words, as well. They are called noun phrases because the headword (i.e., the word that the rest of the phrase, if any, modifies) is a noun or a pronoun. For search and other language applications, noun phrase extraction is useful because much of the interesting information in text is carried by noun phrases. In addition, most search queries are noun phrases. Thus, knowing the location of the noun phrases within documents and, further, extracting them can be an important step for tagging applications.

For the end user interface, periodically, terms can be suggested to the administrator for adding to the vocabulary. The existing interface for user-suggested vocabulary could be used for displaying the terms to the administrator. In one example implementation, a stop word removal feature can be provided on connector 40 (e.g., this could make implementation of the feedback loop more efficient). In other instances, the stop word removal feature is placed on collector 54 so that only the filtered fields are sent over to connector 40. The concept field can be accessible like other fields in the received/collected documents. The concept field is a list of string field values. Additional functionalities associated with these operations are best understood in the context of several examples provided below.

While this is occurring, in a separate workflow personal vocabulary can be developed. Thus, communication system 10 can generate personal vocabulary using corporate vocabulary, which is propagating in the network. In practical terms, it is difficult to tag user traffic in a corporate (i.e., enterprise) environment. There are two modes in which corporate vocabulary can be generated. First, in a learning mode, where end users are not yet subscribed, automatic corporate vocabulary can be generated by tagging content as it flows through the network. This can be generated by tagging content anonymously in the network. This typically happens in the learning mode of the system, where no users are subscribed on the system. The user whose content is being tagged is not necessarily of interest at the time of corporate vocabulary generation. Second, in a real-time system scenario, as users begin using the system, users have the ability to suggest new words to the corporate vocabulary through a manual process, feedback loops, etc., which are detailed herein.

By contrast, personal vocabulary generation can use corporate vocabulary to tag words for particular users. As documents (e.g., email/http/videos, PDF, etc.) flow through the network, the system checks for words from the corporate vocabulary, tags the appropriate words (e.g., using a whitelist), and then associates those words with particular users. Communication system 10 can include a set of rules and a set of algorithms that decide whether tagged words should be added to a personal vocabulary. Rules include common term threshold, group vocabulary adjustment, etc. Over a period, the user's personal vocabulary develops into a viable representation of subject areas (e.g., categories) for this particular end user. In addition, the user has the ability to add words to his personal vocabulary manually. He also has the ability to mark individual words as public or private, where the latter would prohibit other users in the system from viewing those personal vocabulary words.

Many of these activities can be accomplished by using streaming databases in accordance with one example implementation. In one particular instance, this involves the use of streaming database feeder 50. A streaming database continuously analyzes massive volumes of dynamic information. Streaming database feeder 50 can create a user sub-stream for each user, where the tags could continuously be updated for that user. By writing a simple query, an individual can derive the most prevalent topics (e.g., based on a normalized count and time).

Consider a case where end user 12 has written an email that includes the content "Optical Switching is a terrific technology." This email message can traverse the network and be received at a router (e.g., a large corporate router, a switch, a switched port analyzer (SPAN) port, or some type of virtual private network (VPN) network appliance). Collector 54 can be provisioned at such a location in order to capture data and/or facilitate the identification of content, as described herein.

FIGS. 3 and 4 offer two distinct workflows for communication system 10. FIG. 3 addresses the corporate vocabulary formation, whereas FIG. 3 addresses the personal vocabulary development. It should also be noted that these illustrations are associated with more typical flows involving simplistic documents propagating in a network (e.g., email, word processing documents, PDFs, etc.).

FIG. 3 is a simplified flowchart illustrating one example operation associated with communication system 10. At 305, end user 12 has written an email that includes the content "Optical Switching is a terrific technology." At 310, this email message can traverse the network and be received at a router (e.g., a large corporate router, a switch, a switched port analyzer (SPAN) port, or some type of virtual private network (VPN) network appliance). Collector 54 can be provisioned at such a location in order to capture data and/or facilitate the identification of content, as described herein.

In this particular example, FIFO element 56 may receive data in a raw format, at 315. At 320, text extraction module 58 may extract certain fields in order to identify a title, text, authorship, and a URL associated with this particular document. [Note that as used herein in this Specification, the term 'separate' is used to encompass extraction, division, logical splitting, etc. of data segments in a data flow. The term 'tag' as used herein in this Specification, is used to encompass any type of labeling, maintaining, identifying, etc. associated with data.] Note that for this particular instance (where an email is being sent), the URL can have a blank field.

The title may include a subject line, or an importance/priority parameter, and the text field would have the quoted statement (i.e., content), as written above. At 325, the document is then passed to blacklist 60, which searches (i.e., evaluates) the document to see if any blacklisted words are found in the document. If any such blacklisted words are present, the document is dropped. In one general sense, there are two layers of privacy provided by blacklist 60 and whitelist 66, which are working together. Examples of blacklist words in a corporate environment may include 'salary', 'merger', etc., or possibly words that might offend public users, compromise privacy issues, implicate confidential business transactions, etc. Note that the blacklist (much like the whitelist) can readily be configured by an administrator based on particular user needs. The term 'whitelist' as used herein in this Specification is meant to connote any data sought to be targeted for inclusion into the resultant composite of words for an administrator. Along similar reasoning, the term 'blacklist' as used herein is meant to include items that should not be included in the resultant composite of words.

Provided that the document in this instance is not dropped as a result of the blacklist check, the document passes to document type filter 62. Document type filter 62 performs a quick check of the type of document that is being evaluated, at 330. Again, this component is configurable as an administrator can readily identify certain types of documents as including more substantive or meaningful information (e.g., PDF or Word processing documents, etc.). Along similar reasoning, some documents (such as JPEG pictures) may not offer a likelihood of finding substantive vocabulary (i.e., content) within the associated document. These more irrelevant documents may be (as a matter of practice) not evaluated for content and any such decision as to whether to ignore these documents (e.g., JPEG pictures), or scrutinize them more carefully would be left up to an administrator.

In one example, noun phrase extractor module 64 includes a natural language processing (NLP) component to assist it in its operations. Note that a similar technology may exist in text extraction module 58 to assist it in its respective operations. One objective of noun phrase extractor module 64 is to extract meaningful objects from within text such that the content can be aggregated and further processed by communication system 10. In this example, noun phrase extractor module 64 performs its job by extracting the terms "optical switching" and "technology," as illustrated by 335.

Once this document has propagated through noun phrase extractor module 64, the document passes to whitelist 66, at 340. An administrator may wish to pick up certain whitelisted words in the content, as it propagates through a network. The whitelist can be used on various fields within communication system 10. In this particular example, the whitelist is used to search the title and text fields. At this point, the document is sent to document splitter element 68. Note that there are two documents being created from the original document. In one instance, at 345, document splitter element 68 can receive a document with five fields including the concept field, and perform several operations. First, it creates document #2 using the concept field in document #1. Second, it removes the concept field from document #1. Third, it can remove all fields except the concept field from document #2. Fourth, it can send both document #1 and document #2 to clean topics module 70.

It should be noted that noun phrase extractor module 64 operates best when considering formal statements (e.g., using proper English). Colloquialisms or folksy speech is difficult to interpret from the perspective of any computer system. More informal documentation (e.g., email) can be more problematic, because of the speech that dominates this forum.

Clean topics module 70 is configured to address some of these speech/grammar issues in several ways. In one example implementation, clean topics module 70 can receive two documents, as explained above. It passes document #1 without the concept field. For document #2, having the concept field, it can be configured to employ stop word removal logic, at 350. In this particular arrangement, the following stop words can be removed: first name, last name, user ID; functional stop word: A, an, the, etc.; email stop words: regards, thanks, dear, hi, etc.; non-alphabets: special characters, numbers; whitelist words: words found in a whitelist file configured by the administrator; administrator stop words: administrator rejected system words. Note that the operation of filtering functional stop words is different from filtering email (e.g., administrator stop words). For example, "Back Of America" would not be processed into "Bank America." Thus, stop words between two non-stop words would not necessarily be removed in certain instances.

In addition, and in this particular example, the following rules can be applied: Rule 1: Remove the entire noun phrase if a substring match is found; Rule 2: Remove only the offending culprit; Rule 3: Remove the entire noun phrase if an exact match is found. Particular to this example, rules can be applied in the following order: Drop concept fields containing non-alphabets (Rule 1); Drop concept fields containing (e.g., LDAP) entries (Rule 1); Drop concept fields containing email stop words (Rule 1); Remove the functional stop word only if it is at either end of the concept field. Do not drop the words found in between, apply rule iteratively (Rule 2). Drop the concept field value if it is an exact match with the whitelist words (Rule 1). Drop the concept field value if it is an exact match with the administrator stop words (Rule 1). Note that LDAP filtering can also occur during these activities. For example, if any proper names already in LDAP are identified, the filter can just drop those terms.

At 355, vocabulary feeder module 44 can receive the documents (e.g., on the connector side). Vocabulary feeder module 44 forwards the document without the concept field and, for the document with the concept field, it sends it to streaming database feeder 50. In one instance, the streams are associated with storage technology, which is based on a stream protocol (in contrast to a table format). In other instances, any other suitable technology can be employed to organize or to help process the incoming documents, content, etc. The streams can be updated by vocabulary feeder module 44.

More specifically, the analytics approach of connector 40 (in one example) involves having queries analyze streaming data. This strategy for handling continuously flowing data is different from traditional business intelligence approaches of first accumulating data and then running batch queries for reporting and analysis. Such an approach enables analysis of heterogeneous data regardless of whether the data is flowing, staged, etc. In addition, queries are continuous and constantly running so new results are delivered when the downstream application can use them. Data does not need to be stored or modified, so the system can keep up with enormous data volumes. Thousands of concurrent queries can be run continuously and simultaneously on a server architecture. Queries can be run over both real-time and historical data. Incoming data can be optionally persisted for replay, back-testing, drill-down, benchmarking, etc.

Returning to the flow of FIG. 3, vocabulary feeder module 44 can read the concept field (e.g., created by the NLP module) and can feed the noun phrases to the raw vocabulary stream (e.g., "raw_vocab_stream" file), at 360. The vocabulary feeder mechanism can calculate the weight of each of the topics in the concept field by looking up a hash map (initialized from a file) between the number of terms and corresponding weight and, subsequently, feed the topic, calculated weight, and timestamp into the raw vocabulary stream. The vocabulary feeder's output can be configured to interface with the vocabulary stream. The streams aggregate the topics into (for example) a weekly collapsed vocabulary table (e.g., "weekly_collapsed_vocab_table" file), which could be updated during any suitable timeframe (e.g., hourly). This table serves as input to table write service element 48.

In regards to the periodic write service, a periodic service can invoke the write to administrator table service, as explained above. This service can be configurable for the following: silent mode, hourly, daily, weekly, monthly. Hourly, daily, weekly, and monthly modes designate that the terms are suggested to an administrator on the specified intervals. Hourly intervals could be used for testing purposes. A silent mode offers a file based approach, where terms are written to a file, and do not make it to the administrator user interface.

For table write service element 48, a service layer can read the weekly collapsed vocabulary table for the top words and write to the administrator user interface table. The administrator user interface table can represent the shared table between user-suggested vocabulary terms and the system suggested vocabulary terms. Administrator suggest interface 38 can read the user-suggested vocabulary table ("userSuggestedVocabulary table") to display the terms. This module can suggest the top 'n' words to the administrator for adding to the vocabulary whitelist. Feedback loop module 36 may include application program interfaces (APIs) being provided to create a file from the table of suggested vocabulary terms.

In this example, at 365, administrator suggest interface 38 reads the weekly collapsed vocabulary table to display the terms. This element also suggests the top (e.g., 'n') words to an administrator for addition to the vocabulary whitelist. The administrator is provided a user interface to make decisions as to whether to add the term to the whitelist, add it to the blacklist, or to ignore the terms. In one example implementation, the administrator does not suggest new stop words. Only system suggested (or user suggested) stop words can be rejected.

Feedback loop module 36 is coupled to administrator suggest interface 38. At 370, the administrator chooses the "reject term" option, the system can add the term to the list of existing stop words and, further, propagate it to collector 54 to copy over to a file (e.g., adminStopWords.txt). Network collaboration platform 32 can create a file from the table suggested vocabulary terms (e.g., via commands including suggestedby=system, and status=rejected). This file can be a part of the force sync files that can be pushed to the collector/connector (depending on where the stop words mechanism resides). At 375, emerging vocabulary topics element 46 can look up emerging topics (e.g., within harvested documents) and, systematically, add the emerging and top topics to the architecture for the administrator to consider. Both options can be provided to an administrator. The emerging topics can be similar to the experience tags such that topics growing in prominence over a given time interval (e.g., a week) can be suggested to an administrator.

FIG. 4 is a simplified flowchart illustrating one example operation associated with communication system 10. In this particular flow, an email is written from a first end user (John) to a second end user (Bill) at 410. The email from John states, "Search engines are good" and this is evaluated in the following ways. At 420, authorship is identified and the email is searched for blacklisted and whitelisted words. In essence, a number of text stripping operations occur for the received document (as outlined previously above in FIG. 3). At 430, the whitelisted words are received at LDAP feeder element 42. In one sense, the appropriate concept has been extracted from this email, where insignificant words have been effectively stripped from the message and are not considered further.

At 440, John is associated with the term "search engine" based on John authoring message and, in a similar fashion, Bill is associated with the term "search engine" based on him receiving this message. Note that there is a different weight associated with John authoring this message, and Bill simply receiving it. At 450, weighting module 55 can be invoked in order to assign an intelligent weight based on this message propagating in the network. For example, as the author, John may receive a full point of weight associated with this particular subject matter (i.e., search engines). As the recipient, Bill may only receive a half point for this particular subject matter relationship (where Bill's personal vocabulary would include this term, but it would not carry the same weight as this term being provided in John's personal vocabulary).

At 460, weighting module 55 may determine how common this word choice (i.e., "search engine") is for these particular end users. For example, if this were the first time that John has written of search engines, it would be inappropriate to necessarily tag this information and, subsequently, identify John as an expert in the area of search engines. This email could be random, arbitrary, a mistake, or simply a rare occurrence. However, if over a period, this terminology relating to search engines becomes more prominent (e.g., reaches a threshold), then John's personal vocabulary may be populated with this term.

In this particular example, at 470, several days after the initial email, John sends Bill a second email that includes a white paper associated with search engines, along with an accompanying video that is similarly titled. Connector 40 has the intelligence to understand that a higher weight should be accorded to this subsequent transmission. Intuitively, the system can understand that certain formats (White Papers, video presentations, etc.) are more meaningful in terms of associating captured words with particular subject areas. At 480, weighting module 55 assigns this particular transmission five points (three points for the White Paper and two points for the video presentation), where the five points would be allocated to John's personal vocabulary associated with search engines. In addition, Bill is also implicated by this exchange, where he would receive a lesser point total for (passively) receiving this information. In this instance, at 490, Bill receives three points as being a recipient on this email. At 500, the point totals are stored in an appropriate database on a per-user basis.

Additionally, over time, a social graph can be built based on the connection between John and Bill and, in particular, in the context of the subject area of search engines. In one sense, the weight between these two individuals can be bidirectional. A heavier weight is accorded to John based on these transmissions because he has been the dominant author in these exchanges. If Bill were to become more active and assume an authorship role in this relationship, then the weight metric could shift to reflect his more proactive involvement. In one particular example, a threshold of points is reached in order for Bill's personal vocabulary to include the term 'search engine.' This accounts for the scenario in which a bystander is simply receiving communications in a passive manner.

The architecture discussed herein can continue to amass and aggregate these counts or points in order to build a personal vocabulary (e.g., personal tags) for each individual end user. The personal vocabulary is intelligently partitioned such that each individual has his own group of tagged words to which he is associated. At the same time, a social graph can continue to evolve as end users interact with each other about certain subject areas.

In contrast to other systems that merely identify two individuals having some type of relationship, the architecture provided herein can offer the context in which the relationship has occurred, along with a weighting that is associated with the relationship. For example, with respect to the John/Bill relationship identified above, these two individuals may have their communications exclusively based on the topic of search engines. Bill could evaluate his own personal vocabulary and see that John represents his logical connection to this particular subject matter. He could also evaluate other less relevant connections between his colleagues having (in this particular example) a weaker relationship associated with this particular subject matter. Additionally, an administrator (or an end user) can construct specific communities associated with individual subject matter areas. In one example, an administrator may see that John and Bill are actively involved in the area of search engines. Several other end users can also be identified such that the administrator can form a small community that can effectively interact about issues in this subject area.

In another example, entire groups can be evaluated in order to identify common subject matter areas. For example, one group of end users may be part of a particular business segment of a corporate entity. This first group may be associated with switching technologies, whereas a second group within the corporate entity may be part of a second business segment involving traffic management. By evaluating the vocabulary exchanged between these two groups, a common area of interest and possible expertise can be identified. In this particular example, the personal vocabulary being exchanged between the groups reveals a common interest and possible expertise in the subject of deep packet inspection.

FIG. 5 is a simplified table 90 associated with communication system 10. FIG. 5 can include terms and users to be associated with expertise topics, where absolute expertise (e.g., expertise related to the person in question, in the context of the enterprise, etc.) is being identified. Each person's potential expertise can be evaluated against other users of the system (e.g., relative expertise), where the other users can be provisioned or populated by an administrator, by themselves individually, or via their network data. The set of expertise topics can belong to vocabulary terms and noun-phrases that are derived.

Table 90 can relate to expertise derivation using suitable database structures. In operation, a database of terms can be maintained for the vocabulary and the noun phrases. For each term in the vocabulary, the top individuals that are most expressive on that topic (identified through network data analysis, or through provisioning) are mapped and maintained. Since the summarization of this dataset is used for efficiency purposes, a streaming database engine can be employed in one particular instance. Table 90 can be populated in one particular implementation as shown in FIG. 5, where the format assumes a maximum configured number of experts per topic being designated as two (in this example). Table 90 can be active in the sense that a count for each user can be kept systematically, where the top users (that have the highest counts) are reported. Each time that the expertise of a user is requested, a query user='username' can be made on the top user fields (e.g., TOP_USER1='username' OR TOP_USER2='username'). The resulting rows of table 90 are representative of the expertise derived for a particular user.

FIG. 6 is a simplified flowchart 600 illustrating one possible activity associated with the communication system 10. At 602, each term in the vocabulary can be maintained such that it can be readily searched. At 604, for each term in the vocabulary, a query can be run. At 606, a current index is generated, or otherwise updated. At 608, faceting (i.e., sorting) on authors field is ran. At 610 expertise tags of top authors are updated with the current query term. In a particular embodiment, at 614, the authors are sorted and a number of top authors are extracted. At 612, a particular expertise tag can be attached to specific user profiles.

When new words are being dynamically added to the vocabulary using different flows, the following activity can occur. A given database can track the noun-phrases extracted and, further, increment counts for these objects. In addition, an associated database can maintain the possible terms. In certain types of flows, an algorithm that can flatten out oscillation in expertise tags can be employed to eliminate rapidly changing tags (e.g., keep track of the last few sets of tags, delete a tag only if it is not on the list of tags for a certain time period, etc.).

Figure 7:
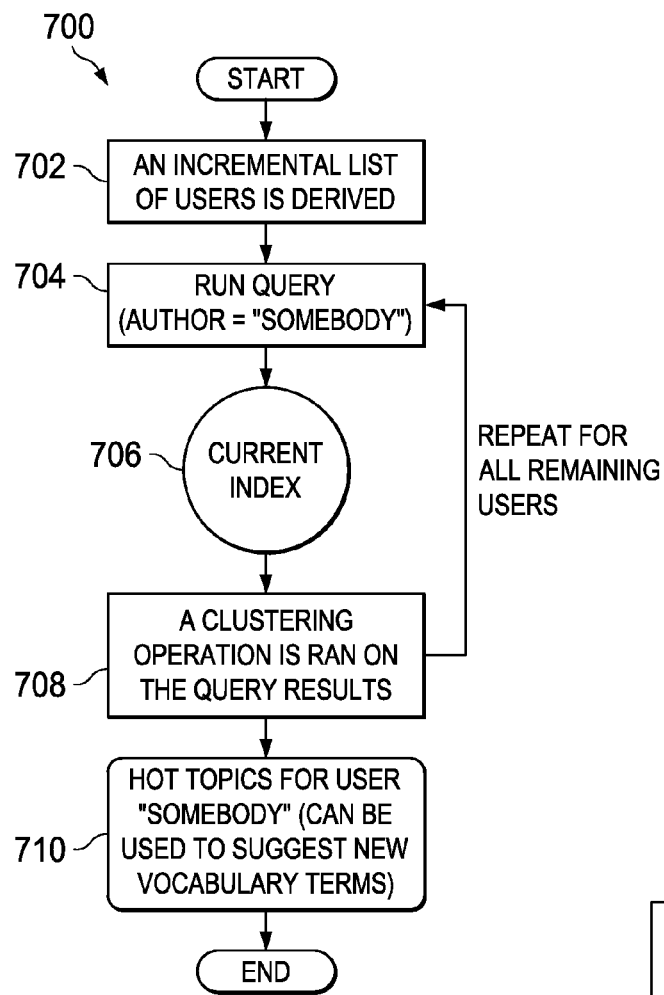
FIG. 7 is a simplified flowchart illustrating potential operations associated with one embodiment of the present disclosure.

FIG. 7 is a simplified flowchart 700 illustrating one activity associated with communication system 10. The activity being depicted by FIG. 7 relates to deriving relative expertise (e.g., expertise related to the person in question, even if their expertise in the context of the enterprise may be low when compared to other individuals). A hot topics element can be used as a summary of the topics, either on a per-user basis, on a system basis, etc. At 702, an incremental list of users is derived. At 704, a query is ran for a particular author (e.g., "somebody"). At 706, a current index is provided. At 708, a clustering operation is ran on the query results. At 710, hot topics for the particular user are generated, where the information can be used to suggest new vocabulary terms. The particular clustering activity can be based on a live index in certain implementations. An offline task can be scheduled at a predefined time interval, which is configurable by the administrator. Each time the task is initiated, it can derive expertise for each user of the system. Optionally, the load can be spread across subgroups of users (e.g., midnight every day, users are processed having the last name in the intervals [A-C], [D-F], etc.). Another way to minimize excessive query processing would be to run one of the queries each time a user accesses his own profile page, combined with an email/uniform resource locator (URL) threshold (e.g., if a user sent more than 'x' emails, a query would be run, and an end user's profile would be updated with corresponding expertise tags).

Figure 8:
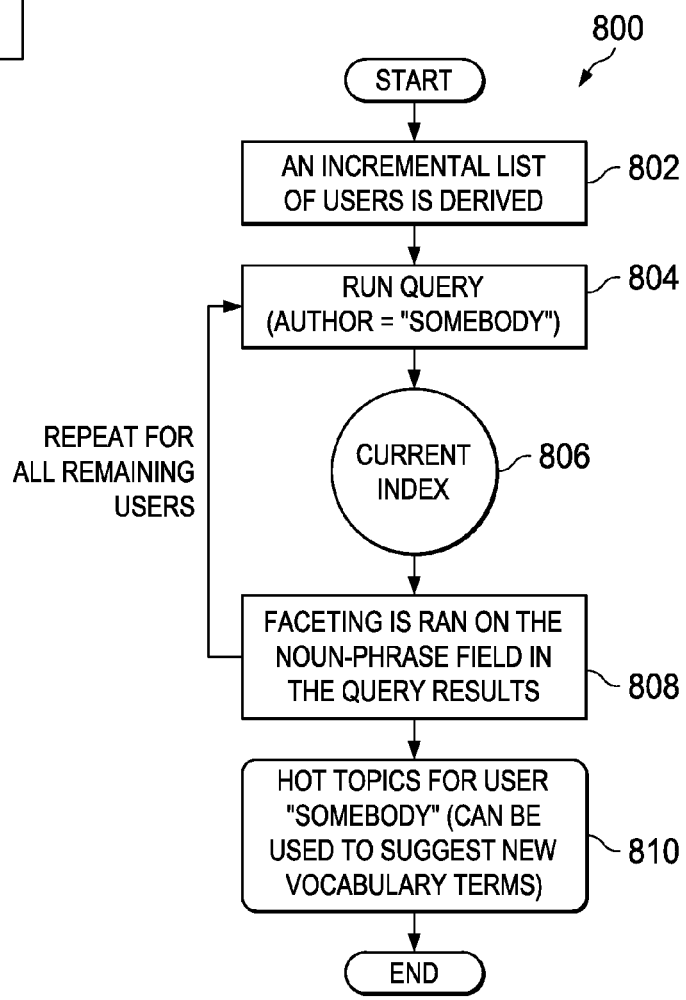
FIG. 8 is a simplified flowchart illustrating potential operations associated with one embodiment of the present disclosure.

FIG. 8 is a simplified flowchart 800 illustrating one activity associated with the communication system 10. The particular flow of FIG. 8 is associated with using noun-phrase extraction and facets. Instead of applying clustering, communication system 10 can use noun-phrase extractor module 64 (on the indexing side) to populate a 'noun-phrase' metadata field for each indexed document. Then, at query time, the same mechanisms described above can be used to evaluate the list of users and, for each query, (i.e., author='username'), the results can be faceted by the noun-phrase field. This will imply that the most used noun-phrases by that particular user can be shown as the hot topic for that person.

At 802, an incremental list of users is derived. At 804, a query is ran for a particular author (e.g., "somebody"). At 806, a current index is provided. At 808, faceting is ran on the noun-phrase fields in the query results. At 810, hot topics can be developed for this particular user (e.g., "somebody"), where the hot topics can be used to suggest new vocabulary terms, as shown in 350.

Figures 9, 10:
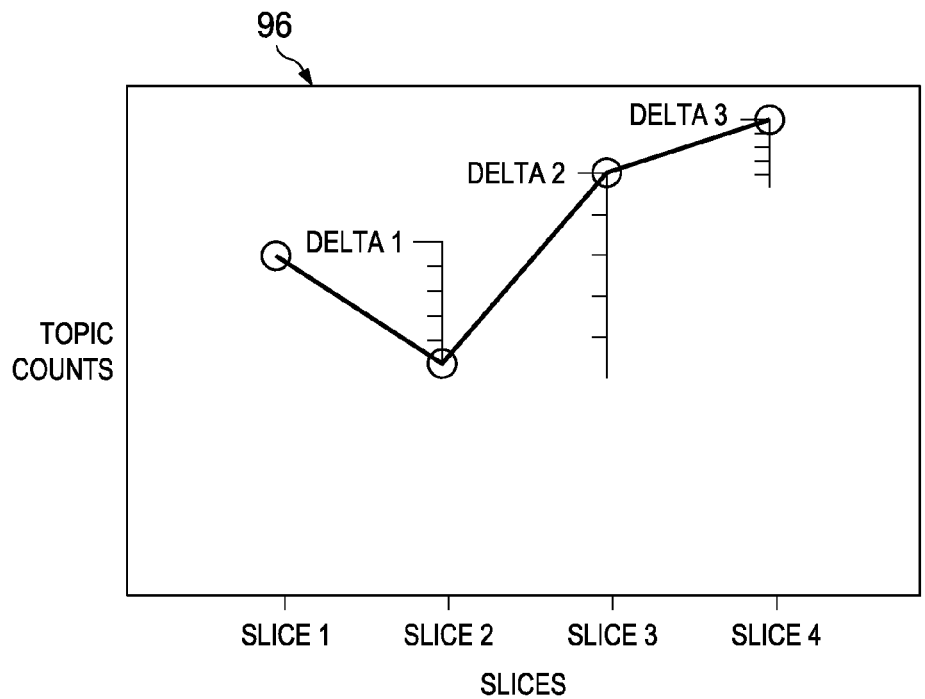
FIG. 9 is a simplified table illustrating a series of example users and terms associated with the communication system.
FIG. 10 is a simplified graph illustrating an example set of delta values associated with deriving potential topics associated with the communication system.

FIG. 9 is a simplified table 94 illustrating one possible object to be included in databases within communication system 10. Note that communication system 10 can maintain a database of users along with all possible keywords. Each time a term is seen in the indexed data, a corresponding counter can be incremented to reflect the number of occurrences for this particular term. Table 94 can be uniformly sorted (e.g., using streaming databases), or table 94 can be sorted at the time a list of 'hot topics' is needed (e.g., per user, sort the table and identify the top 'x' most used vocabulary terms).

In regards to aggregating hot topics over the set of users, the following flows are possible. For a first flow, a query can be made for all records, where results would be clustered to obtain the top results. For a second flow, a query can be made for specified records, where faceting can be executed on the noun-phrase field to obtain the top results. For a third type of flow, an aggregate user is added to the user pool, where statistics are maintained for this particular user. Note that if a set of top URLs needs to be derived, the same kind of database mechanism can be used to achieve this result (i.e., providing an active table of URLs seen by collector 54). In a particular embodiment, the set of top URLs may be the URLs in valuable page list 73. In terms of configurable parameters, a given administrator can configure a number of per-topic experts, a number of per-user hot topics derived, a number of system-wide hot topics derived, etc. Application program interfaces (APIs) can be used for each of these configurable parameters in particular implementations of the present disclosure.

FIG. 10 is a simplified graph 96 illustrating an example set of delta values associated with deriving emerging topics. There are various possible algorithms that can be used to derive emerging topics, which commonly have a higher rate of change/incidents over time than the top topics. In a first example method, existing database tables can be used to compute changes between a given data segment (e.g., a slice), as depicted by graph 96.

The computation can involve using several measurements of change, or a combination of these elements. The appropriate measurements can include average delta, average positive delta, and the maximum delta. In one particular implementation, the average delta can be defined as: $(-\text{delta}1+\text{delta}2+\text{delta}3)/3$. Additionally, the average positive delta can be defined as: $(\text{Delta}2+\text{Delta}3)/3$. Furthermore, the maximum delta can be defined as delta2, as is detected in graph 96. In a second methodology, streaming databases can be used to directly derive a rate of change from the initial raw streams. While this method is more accurate (because it can use a broader set of topics, not only the ones in a top topics table), it may necessitate schema.

For deriving emerging topics, the first methodology identified above can be used. The measurements presented can be calculated, where internal knobs can be exposed to be able to choose one (or a combination) of these measurements. The final result can be a list of ordered topics (e.g., ordered using any of these parameters). A simple API can be used in such activities. For scheduling semantics, a quartz scheduling mechanism (also used by streaming databases) can be used to schedule a job that can query the associated database on a daily basis (e.g., verifying if the database has been changed, where iteration over the topics can subsequently occur). For topics retrieval, a database connection can be opened, where the collapsed topics (e.g., weekly) table can be queried to retrieve a list of unique top topics. The list of topics can be iterated, where the slices (daily) can be retrieved, along with their slice access counts. The deltas can then be suitably computed, as described above.

Software for providing intelligent expertise derivation can be provided at various locations of communication system 10. In one example implementation, this software is resident in a network element, such as connector 40 and/or collector 54, or in another network element for which this capability is relegated. In other examples, this could involve combining connector 40 and/or collector 54 with an application server or a gateway, or some proprietary element, which could be provided in (or be proximate to) these identified network elements, or this could be provided in any other device being used in a given network. In one specific instance, connector 40 provides the expertise derivation features explained herein, while collector 54 can be configured to offer the raw data collection activities detailed herein. In such an implementation, collector 54 can initially receive the data, employ its filtering functions, and then send the results to expertise tag derivation module 57, which can develop or otherwise process this information for deriving expertise.

In other embodiments, the expertise derivation feature may be provided externally to connector 40, or included in some other network device, or in a computing mechanism to achieve these intended functionalities. As identified previously, a network element can include software to achieve the expertise derivation operations, as outlined herein in this document. In certain example implementations, the expertise derivation functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.).

Figure 11:
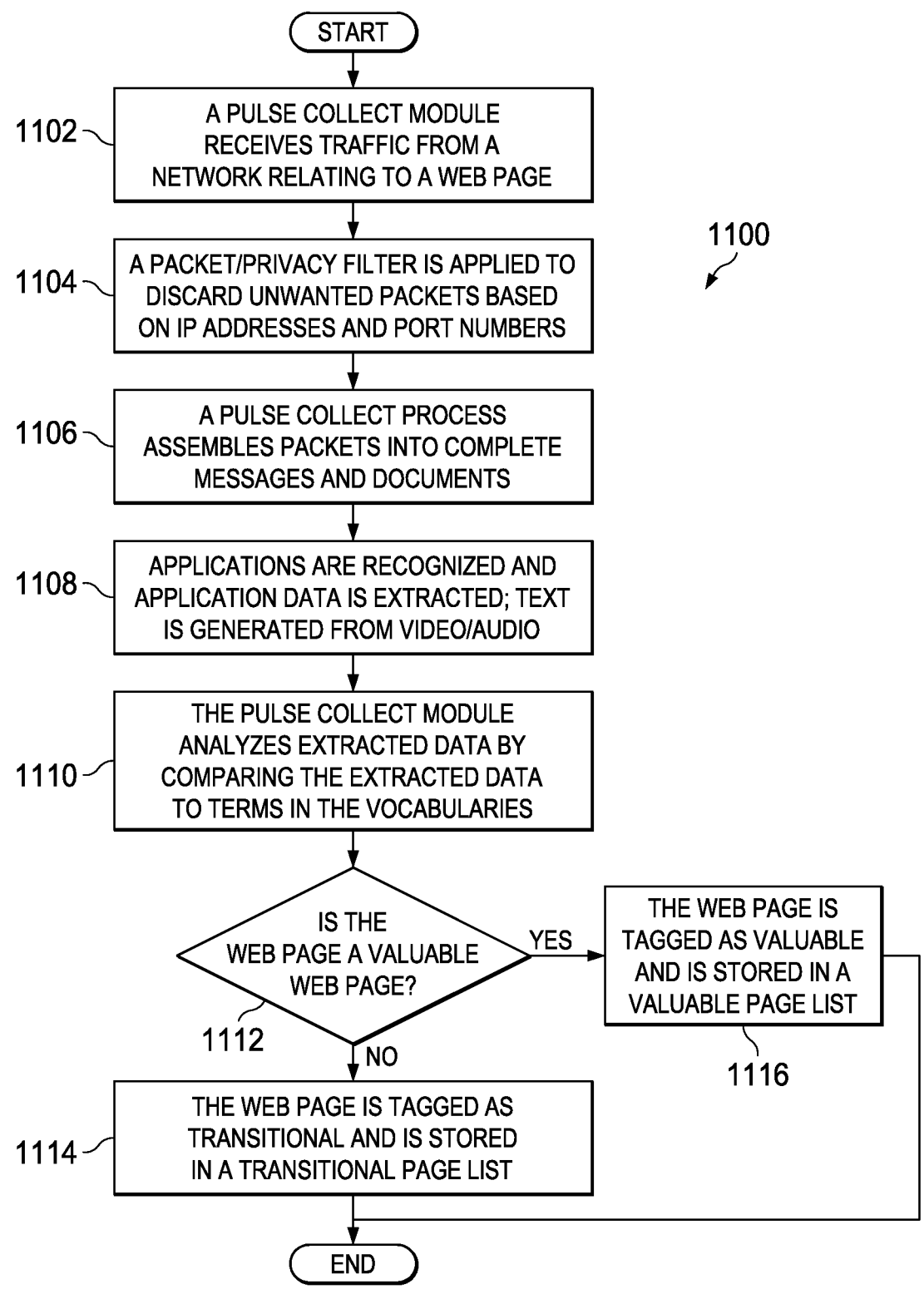
FIG. 11 is a simplified flowchart illustrating potential operations associated with one embodiment of the present disclosure.

Turning to FIG. 11, FIG. 11 is a simplified flowchart 1100 illustrating example activities associated with deriving user expertise based on data propagating in a network environment. At 1102, a collect module can receive network traffic associated with a web page. For example, transitional page detection engine 75 may receive traffic from IP network 14, where that user traffic relates to a web page. At 1104, a packet/privacy filter can be applied to discard unwanted packets (e.g., based on IP addresses and port numbers). For example, blacklist 60 may filter out unwanted packets based on IP addresses and port numbers.

In a particular embodiment, communication system 10 focuses on web pages, email, etc. and does not necessarily evaluate all network traffic. At 1106, a collect process assembles packets into complete messages and documents. At 1108, applications are recognized, where application data is extracted (e.g., text is generated from video/audio). At 1110, the collection module can analyze extracted data by comparing the extracted data to specific terms, which can be found in vocabularies. For example, vocabulary can be used in content filtering activities (e.g., using whitelist 66 and blacklist 60). At 1112, the architecture can determine if the web page is a valuable web page. For example, communication system 10 may determine if a condition was satisfied (e.g., a predetermined amount of time, one or more social gestures, etc.) while the web page was being accessed. If the web page is a valuable web page, then the web page is tagged as such and provided to (e.g., stored in) a valuable page list. This is illustrated in 1116. If the web page is not a valuable web page, then the web page is tagged as transitional and subsequently stored in a transitional page list, as illustrated in 1114. By using the URLs in valuable page list 73, and other suitable mechanisms, user expertise may be derived based on the network data.

Software for providing intelligent vocabulary building and URL classification functionalities can be provided at various locations. In one example implementation, this software is resident in a network element (e.g., provisioned in connector 40, NCP 32, and/or collector 54) or in another network element for which this capability is relegated. In other examples, this could involve combining connector 40, NCP 32, and/or collector 54 with an application server, a firewall, a gateway, or some proprietary element, which could be provided in (or be proximate to) these identified network elements, or this could be provided in any other device being used in a given network. In one specific instance, connector 40 provides the personal vocabulary building features explained herein, while collector 54 can be configured to offer the URL classification activities detailed herein. In such an implementation, collector 54 can initially receive the data, employ its evaluation functions, and process the information such that appropriate data is pushed to one or more video portals.

In other embodiments, the URL classification features may be provided externally to collector 54, NCP 32, and/or connector 40, or included in some other network device, or in a computer to achieve these intended functionalities. As identified previously, a network element can include software to achieve the URL classification and vocabulary building operations, as outlined herein in this document. In certain example implementations, the URL classification and vocabulary building functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in some of the preceding FIGURES] can store data used for the operations described herein.

This includes the memory element being able to store software, logic, code, or processor instructions that are executed to carry out the activities described in this Specification. A processor can execute any type of instructions associated with the data to achieve the operations detailed herein in this Specification. In one example, the processor [as shown in some of the preceding FIGURES] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the vocabulary building and URL classification, as outlined herein. Additionally, each of these devices may include a processor that can execute software or an algorithm to perform the vocabulary building and URL classification activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that communication system 10 of FIG. 1A (and its teachings) are readily scalable. Communication system 10 can accommodate a large number of components, as well as more complicated or sophisticated arrangements and configurations. Accordingly, the examples provided should not limit the scope or inhibit the broad teachings of communication system 10 as potentially applied to a myriad of other architectures.

It is also important to note that the steps described with reference to the preceding FIGURES illustrate only some of the possible scenarios that may be executed by, or within, communication system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the discussed concepts.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method performed at a network element in a network, comprising:
    evaluating network traffic associated with a plurality of users in the network;
    identifying data within the network traffic that is associated with a uniform resource locator (URL);
    identifying at least one condition associated with the URL and a majority of the users;
    classifying the URL as a transitional web page or as a valuable web page based on the condition;
    building a personal vocabulary for each user based at least on keywords identified in the network traffic and each user's interaction with the network traffic over a period of time; and
    determining an area of expertise for at least one user and a level of expertise for the at least one user based on the classification and the personal vocabulary of the at least one user.

2. The method of claim 1, further comprising:
    storing a first URL in a transitional page list;
    storing a second URL in a valuable page list; and
    receiving a search query associated with expertise in a subject, wherein the valuable page list is evaluated in generating a response to the search query.

3. The method of claim 2, wherein the area of expertise for the at least one user and the level of expertise for the at least one user are based on elements provided in the transitional page list and the valuable page list.

4. The method of claim 2, further comprising:
    evaluating a transitional URL in the transitional page list; and
    reclassifying the transitional URL such that it is provided to the valuable page list.

5. The method of claim 1, wherein the condition is associated with a time interval for which the URLs are accessed.

6. The method of claim 1, wherein the condition relates to a context in which the URL was accessed, and wherein the context is associated with an e-mail transmission.

7. The method of claim 1, further comprising:
    providing a transitional URL to a blacklist after a number of times the transitional URL has been classified for inclusion in a transitional page list.

8. The method of claim 1, further comprising:
    maintaining a hash table during a browsing session to determine if the condition has been satisfied for each uniform resource locator accessed during the browsing session.

9. Non-transitory media encoding logic that includes code for execution and when executed by a processor is operable to perform operations comprising:
    evaluating network traffic associated with a plurality of users in a network;
    identifying data within the network traffic that is associated with a URL;
    identifying at least one condition associated with the URL and a majority of the users;
    classifying the URL as a transitional web page or as a valuable web page based on the condition;
    building a personal vocabulary for each user based at least on keywords identified in the network traffic and each user's interaction with the network traffic over a period of time; and
    determining an area of expertise for at least one user and a level of expertise for the at least one user based on the classification and the personal vocabulary of the at least one user.

10. The media of claim 9, the operations further comprising:
    storing a first URL in a transitional page list;
    storing a second URL in a valuable page list; and
    receiving a search query associated with expertise in a subject, wherein the valuable page list is evaluated in generating a response to the search query.

11. The media of claim 10, wherein the area of expertise for the at least one user and the level of expertise for the at least one user are based on elements provided in the transitional page list and the valuable page list.

12. The media of claim 10, the operations further comprising:
    evaluating a transitional URL in the transitional page list; and
    reclassifying the transitional URL such that it is provided to the valuable page list.

13. The media of claim 9, wherein the condition is associated with a time interval for which the URLs are accessed.

14. The media of claim 9, wherein the condition relates to a context in which the URL was accessed, and wherein the context is associated with an e-mail transmission.

15. The media of claim 9, the operations further comprising:
    providing a transitional URL to a blacklist after a number of times the transitional URL has been classified for inclusion in a transitional page list.

16. The media of claim 9, the operations further comprising:

maintaining a hash table during a browsing session to determine if the condition has been satisfied for each uniform resource locator accessed during the browsing session.

17. An apparatus, comprising:
a memory element configured to store data;
a processor operable to execute instructions associated with the data;
a collector element configured to interface with the memory element and the processor, wherein the apparatus is configured for:
evaluating network traffic associated with a plurality of users in a network;
identifying data within the network traffic that is associated with a URL;
identifying at least one condition associated with the URL and a majority of the users;
classifying the URL as a transitional web page or as a valuable web page based on the condition;
building a personal vocabulary for each user based at least on keywords identified in the network traffic and each user's interaction with the network traffic over a period of time; and
determining an area of expertise for at least one user and a level of expertise for the at least one user based on the classification and the personal vocabulary of the at least one user.

18. The apparatus of claim 17, wherein the apparatus is further configured for:
storing a first URL in a transitional page list; and
storing a second URL in a valuable page list
wherein the area of expertise for the at least one user and the level of expertise for the at least one user are based on elements provided in the transitional page list and the valuable page list.

19. The apparatus of claim 17, wherein the condition relates to a context in which the URL was accessed, and wherein the context is associated with an e-mail transmission.

20. The apparatus of claim 17, wherein the apparatus is further configured for:
maintaining a hash table during a browsing session to determine if the condition has been satisfied for each uniform resource locator accessed during the browsing session.

\* \* \* \* \*